(12) United States Patent
Scott et al.

(10) Patent No.: US 8,874,764 B2
(45) Date of Patent: Oct. 28, 2014

(54) SAVING A CONNECTION PROFILE WHEN UNABLE TO CONNECT TO A WIRELESS LOCAL AREA NETWORK

(75) Inventors: Sherryl Lee Lorraine Scott, Toronto (CA); Zaheen Somani, Richmond (CA); Alexander Jordan Reif, London (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/027,823

(22) Filed: Feb. 15, 2011

(65) Prior Publication Data

US 2011/0238847 A1 Sep. 29, 2011

Related U.S. Application Data

(62) Division of application No. 11/943,332, filed on Nov. 20, 2007, now abandoned.

(60) Provisional application No. 60/866,753, filed on Nov. 21, 2006.

(51) Int. Cl.
*G06F 15/16* (2006.01)
*G06F 15/177* (2006.01)
*H04W 48/18* (2009.01)
*H04L 29/08* (2006.01)
*H04W 84/12* (2009.01)

(52) U.S. Cl.
CPC ............. *H04W 48/18* (2013.01); *H04L 67/16* (2013.01); *H04L 67/36* (2013.01); *H04L 67/30* (2013.01); *H04W 84/12* (2013.01)
USPC ............ 709/228; 709/221; 709/222; 715/735

(58) Field of Classification Search
CPC ....... H04L 1/0026; H04L 67/14; H04L 67/28; H04L 67/30; H04L 67/303; H04L 67/306; H04L 29/06306; H04L 29/08576; H04L 29/08918; H04L 29/08927; H04L 29/08936; H04W 28/18; H04W 48/17; H04W 48/18; H04W 48/20; H04W 68/00; H04W 68/005; H04W 76/00; H04W 76/02; H04W 76/04; H04W 76/06; H04W 84/12
USPC .......................... 709/227–228; 715/735–736
See application file for complete search history.

(56) References Cited

U.S. PATENT DOCUMENTS 5,870,744 A    2/1999  Sprague
5,903,832 A *  5/1999  Seppanen et al. .......... 455/435.3

(Continued)

FOREIGN PATENT DOCUMENTS

CN    1568028    1/2005
EP    0781064    6/1997

(Continued)

OTHER PUBLICATIONS

Belkin Corporation: "User Manual F5D6020" 1-14, Jul. 17, 2003, XP002604419, http://cache-www.belkin.com/support/dl/f5d6020v3.pdf.

(Continued)

*Primary Examiner* — Patrice Winder
(74) *Attorney, Agent, or Firm* — Integral Intellectual Property Inc.; Miriam Paton

(57) ABSTRACT

Various connection parameters of a wireless local area network 'WLAN' may be saved in a WLAN client device in a connection profile, even if the WLAN client device is unable to connect to the WLAN.

10 Claims, 21 Drawing Sheets

(56) References Cited

U.S. PATENT DOCUMENTS

| | | | |
|---|---|---|---|
| 6,718,339 B2* | 4/2004 | Eden | 370/351 |
| 6,961,762 B1 | 11/2005 | Yeap et al. | |
| 7,395,341 B2 | 7/2008 | Nicodemus et al. | |
| 7,603,119 B1* | 10/2009 | Durig et al. | 455/432.3 |
| 7,680,127 B2* | 3/2010 | Yang | 370/395.42 |
| 7,920,531 B2* | 4/2011 | Gupta et al. | 455/434 |
| 8,245,284 B2* | 8/2012 | Jiang et al. | 726/7 |
| 8,340,065 B2* | 12/2012 | Gupta et al. | 370/338 |
| 8,358,638 B2* | 1/2013 | Scherzer et al. | 370/338 |
| 2002/0007407 A1 | 1/2002 | Klein | |
| 2003/0003933 A1 | 1/2003 | Deshpande et al. | |
| 2003/0204748 A1* | 10/2003 | Chiu | 713/201 |
| 2003/0219022 A1 | 11/2003 | Dillon et al. | |
| 2004/0077341 A1 | 4/2004 | Chandranmenon et al. | |
| 2004/0100973 A1 | 5/2004 | Prasad | |
| 2004/0114601 A1 | 6/2004 | Watanabe et al. | |
| 2004/0264427 A1* | 12/2004 | Jaakkola et al. | 370/338 |
| 2005/0181734 A1* | 8/2005 | Coutts et al. | 455/67.16 |
| 2005/0237967 A1 | 10/2005 | Lee et al. | |
| 2005/0254435 A1 | 11/2005 | Moakley et al. | |
| 2005/0260973 A1 | 11/2005 | Van de Groenendaal | |
| 2005/0260989 A1 | 11/2005 | Pourtier et al. | |
| 2005/0260996 A1 | 11/2005 | van de Groenendaal | |
| 2006/0069760 A1 | 3/2006 | Yeap et al. | |
| 2006/0075090 A1 | 4/2006 | Bocking et al. | |
| 2006/0168438 A1 | 7/2006 | Klein | |
| 2006/0173844 A1 | 8/2006 | Zhang et al. | |
| 2006/0174127 A1 | 8/2006 | Kalavade et al. | |
| 2006/0209773 A1 | 9/2006 | Hundal | |
| 2006/0242305 A1 | 10/2006 | Alnas | |
| 2007/0067446 A1 | 3/2007 | Jones et al. | |
| 2007/0079013 A1 | 4/2007 | Tumsi Dayakar et al. | |
| 2007/0130468 A1 | 6/2007 | Cunningham et al. | |
| 2007/0178933 A1* | 8/2007 | Nelson | 455/550.1 |
| 2007/0208937 A1 | 9/2007 | Cam-Winget et al. | |
| 2007/0249365 A1 | 10/2007 | Jendbro | |
| 2007/0264991 A1 | 11/2007 | Jones et al. | |
| 2007/0275701 A1* | 11/2007 | Jonker | 455/414.1 |
| 2008/0281952 A1* | 11/2008 | Fedotenko | 709/223 |
| 2009/0080390 A1 | 3/2009 | Zhou et al. | |
| 2009/0093264 A1* | 4/2009 | Heredia et al. | 455/466 |
| 2009/0300722 A1 | 12/2009 | Haverinen et al. | |
| 2013/0128815 A1* | 5/2013 | Scherzer et al. | 370/328 |

FOREIGN PATENT DOCUMENTS

| | | |
|---|---|---|
| EP | 1394988 | 3/2004 |
| EP | 1395077 | 3/2004 |
| EP | 1492276 | 12/2004 |
| EP | 1542400 | 6/2005 |
| EP | 1638357 | 3/2006 |
| WO | 0141392 | 6/2001 |
| WO | 2004031488 | 4/2004 |
| WO | 2004077752 | 9/2004 |
| WO | 2005020002 | 3/2005 |
| WO | 2005057860 | 6/2005 |
| WO | 2006004786 | 1/2006 |
| WO | 2006031927 | 3/2006 |
| WO | 2006066181 | 6/2006 |
| WO | 2006111951 | 10/2006 |

OTHER PUBLICATIONS

HotSpot Gatway, Document Rev. 4.2, Mikrotikls Sia, Aizkraukles Iela 23, Riga, LV-1006, Latvia, XP008109261, pp. 1-8 and pp. 13-21, Jul. 4, 2006.

Zuniga, Jackie, Sixth Office Action for U.S. Appl. No. 11/876,428, Mar. 7, 2011.

Planex Communications: "Airgo Wireless Adapter Installation and User Guide", Jul. 2004, XP002604418, http://www.planex.net/pdf/wireless/CQW-NS108AG_Manual_Eng.pdf, Chapters 2,3; p. 1-5, XP002506563.

"HotSpot Gateway", Jul. 4, 2006.

"iPhone user guide", http://en.wikipedia.org/wiki/AirPort, published Jun. 29, 2007.

"Wireless LAN Enhancements in Windows XP Service Pack 2, Aug. 2004", http://www.microsoft.com/technet/community/columns/cableguy/about.mspx 2008.

Casio, "User's Guide, CASSIOPEIA DT-10 Pegasus Setting", 2005, 1-19.

Chin, Allan et al., "Seamless Connectivity to Wireless Local Area Networks", Intel Technology Journal, Wireless Technologies, vol. 7, No. 3, XP008109356, pp. 63-67, Aug. 19, 2003.

Chin, Allan et al., "Seamless Connectivity to Wireless Local Area Networks", Aug. 19, 2003.

Garcia Bolos, Ruth, Extended European Search Report for EP 07845544.1, Oct. 27, 2009.

Garcia Bolos, Ruth, Extended European Search Report for EP 07845545.8, Oct. 29, 2009.

Garcia Bolos, Ruth, Extended European Search Report for EP 07845546.6, Nov. 2, 2009.

Garcia Bolos, Ruth, Second Exam Report for EP 07845543.3, May 5, 2009.

Garcia Bolos, Ruth, Third Exam Report for EP 07845543.3, Nov. 2, 2009.

Garcia Bolos, Ruth, "EESR", Extended European Search Report for EP 07845543.3, Dec. 19, 2008.

Intel, "User Guide, Intel PRO/Wireless 2915ABG Network Connection", Jun. 2005.

Matar, G, First Office Action for CA 2,636,384, Jan. 25, 2011.

Matar, G., First Office Action for CA2,607,823, Oct. 25, 2010.

Mikhailova, Elena, "WOSA", Written Opinion of the International Searching Authority for PCT/CA2007/002074, Mar. 28, 2008.

Zuniga, Jackie, Third Office Action for U.S. Appl. No. 11/876,428, Jul. 21, 2010.

Savin, Daniela, "WOSA", Written Opinion of the International Searching Authority for PCT/CA2007/001887, Feb. 7, 2008.

Straniero, Roberto, Extended European Search Report for EP 07816037.1, Nov. 18, 2010.

Utreja, Neeraj K., Restriction Requirement for U.S. Appl. No. 11/943,332, Feb. 17, 2010.

Utreja, Neeraj K., Second Office Action for U.S. Appl. No. 11/943,332, Jul. 9, 2010.

Utreja, Neeraj K., Third Office Action for U.S. Appl. No. 11/943,332, Dec. 27, 2010.

Zuniga, Jackie, Fifth Office Action for U.S. Appl. No. 11/876,428, Jan. 27, 2011.

Zuniga, Jackie, First Office Action for U.S. Appl. No. 11/876,428, Sep. 10, 2009.

Zuniga, Jackie, Second Office Action for U.S. Appl. No. 11/876,428, Jan. 28, 2010.

Cen, Yiliang, First Office Action for CN 200780049616.6, Aug. 3, 2011.

Chhim, S, First Office Action for CA 2,670,038, Aug. 19, 2011.

Chhim, S, First Office Action for CA 2,670,056, Aug. 17, 2011.

Goncalves, Pais A., Extended European Search Report for EP 11162503.4, Sep. 28, 2011.

Kamps, Stefan, Examination report for EP 09153364.6, Aug. 25, 2011.

Ma, Cathy, First Office Action for CA 2,670,033, Oct. 19, 2011.

Yeow, Leslie, Second Office Action for CA 2,607,823, Aug. 1, 2011.

Zuniga, Jackie, Seventh Office Action for U.S. Appl. No. 11/876,428, Aug. 11, 2011.

Cen, Yilang, Second Office Action for CN 200780049616.6, Jan. 6, 2012.

Plata, Edd R., Office Action for U.S. Appl. No. 12/389,584, Sep. 27, 2011.

Tam, Allan, Second Office Action for CA 2,636,384, Mar. 9, 2012.

Utreja, Neeraj K., First Office Action for U.S. Appl. No. 13/027,806, Dec. 19, 2011.

Utreja, Neeraj K., First Office Action for U.S. Appl. No. 13/093,099, Dec. 22, 2011.

Utreja, Neeraj K., Fourth Office Action for U.S. Appl. No. 11/943,332, Dec. 22, 2011.

Chhim, S., Second Office Action for CA 2,670,038, Mar. 27, 2012.

(56) References Cited

OTHER PUBLICATIONS

Garcia Bolos, Ruth, Second Exam Report for EP 07845544.1, Jul. 4, 2012.
Garcia Bolos, Ruth, Second Exam Report for EP 07845545.8, Jul. 5, 2012.
Garcia Bolos, Ruth, Second Exam Report for EP 07845546.6, Jul. 3, 2012.
Qian, Zijuan, First Office Action for CN 200780039406.9, Mar. 1, 2012.
Cen, Yilang, Third Office Action for CN 200780049616.6, Jul. 30, 2012.
Patel, R.B. et al., Mobile Agents in Wireless LAN and Cellular Data Networks, Journal of Computer Science, vol. 2, Issue 5, pp. 410-418, May 1, 2006.
Utreja, Neeraj K., Second Office Action for U.S. Appl. No. 13/027,806, Sep. 17, 2012.
Utreja, Neeraj K., Second Office Action for U.S. Appl. No. 13/093,099, Oct. 29, 2012.
Yeow, Leslie, Third Office Action for CA 2,607,823, Aug. 13, 2012.
Planex Communications, Installation and User Guide(CQW-NS108AG), Jul. 31, 2004.
Allan, Tam, Third Office Action for CA 2,636,384, Jan. 21, 2013.
Ma, Cathy, Second Office Action for CA 2,670,033, Nov. 21, 2012.
Qian, Zijuan, Second Office Action for CN 200780039406.9, Dec. 5, 2012.
Utreja, Neeraj K., Fifth Office Action for U.S. Appl. No. 11/943,332, Nov. 15, 2012.
Widhalm, Angela M., Advisory Action for U.S. Appl. No. 13/093,099, Feb. 14, 2013.
Notice of Allowance for U.S. Appl. No. 13/027,806, Jul. 12, 2013.
Eighth Office Action for U.S. Appl. No. 11/876,428, Jul. 30, 2013.
Ninth Office Action for U.S. Appl. No. 11/876,428, Aug. 30, 2013.
Garcia Bolos, Ruth, Examination Report for EP 0784545.8, Feb. 25, 2014.
Zuniga Abad, Jackie, Notice of Allowance for U.S. Appl. No. 11/876,428, Mar. 11, 2014.
Garcia Bolos, Ruth, Third Exam Report for EP 07845546.6, Sep. 20, 2013.
Widhalm, Angela M., Advisory Action for U.S. Appl. No. 11/943,332, Mar. 15, 2013.

\* cited by examiner

SAVING A CONNECTION PROFILE WHEN UNABLE TO CONNECT TO A WIRELESS LOCAL AREA NETWORK

CROSS-REFERENCE TO RELATED APPLICATIONS

This application is a divisional of U.S. patent application Ser. No. 11/943,332 filed Nov. 20, 2007, entitled "WLAN Connection Setup Application and Profile Manager", which claims the benefit under 35 U.S.C. §119(e) from U.S. Provisional Patent Application No. 60/866,753, filed Nov. 21, 2006, entitled "WLAN Connection Setup Application and Profile Manager", and which is incorporated by reference herein.

BACKGROUND

A handheld device may be equipped with a wireless local area network (WLAN) communication interface through which the handheld device may be able to connect to a WLAN. IEEE 802.11 networks (also known as Wi-Fi™ networks) and ETSI HIPERLAN networks are examples of WLANs.

A WLAN client device may store in its memory one or more persistent connection profiles of WLANs, each labeled by a connection profile name. A persistent connection profile may include, for example, the service set identity (SSID) of the network, WLAN configuration parameters, security credentials, proxy information, default printer, file and printer sharing, firewall, and Internet Protocol (IP) network parameters. The SSID is also known as the network name. The persistent connection profiles may be assigned priorities, for example, by a user that has purchased the client device, a carrier who controls the sale of the client device, or an administrator of an enterprise that has purchased the client device. Generally, user action is required to delete a persistent connection profile from a client device.

Since a handheld device has a small display and small keyboard, care must be taken when designing a user interface of an application to be run on the handheld device.

BRIEF DESCRIPTION OF THE DRAWINGS

Embodiments are illustrated by way of example and not limitation in the figures of the accompanying drawings, in which like reference numerals indicate corresponding, analogous or similar elements, and in which:

FIGS. 4-1 and 4-2 are illustrations of an exemplary screen which may appear while the handheld device is scanning for available wireless local area networks;

FIGS. 5-1, 5-2, and 5-3 are illustrations of an exemplary screen listing the results of the scanning;

FIGS. 5-4 and 5-5 are illustrations of other exemplary screens listing the results, in full or in part, of the scanning;

FIGS. 6-1, 6-2, 6-3, 6-4, 6-5, 6-6, 6-7, 6-8, 6-9 and 6-10 are illustrations of an exemplary screen for user input of security credentials for a wireless local area network;

FIG. 7 is an illustration of an exemplary screen which may appear while the device is attempting to connect to a particular wireless local area network;

FIGS. 8-1 and 8-2 are illustrations of an exemplary screen which may appear if the device successfully connects to the wireless local area network;

FIGS. 8-3 and 8-4 are illustrations of exemplary screens which may appear if the device is unable to connect to the wireless local area network;

FIGS. 9-1 and 9-2 are illustrations of an exemplary screen for virtual private network (VPN) selection;

FIGS. 10-1 and 10-2 are illustrations of an exemplary setup completion screen;

FIGS. 12-1 and 12-2 are illustrations of an exemplary screen of a wireless local area network profile management application;

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Figure 1:
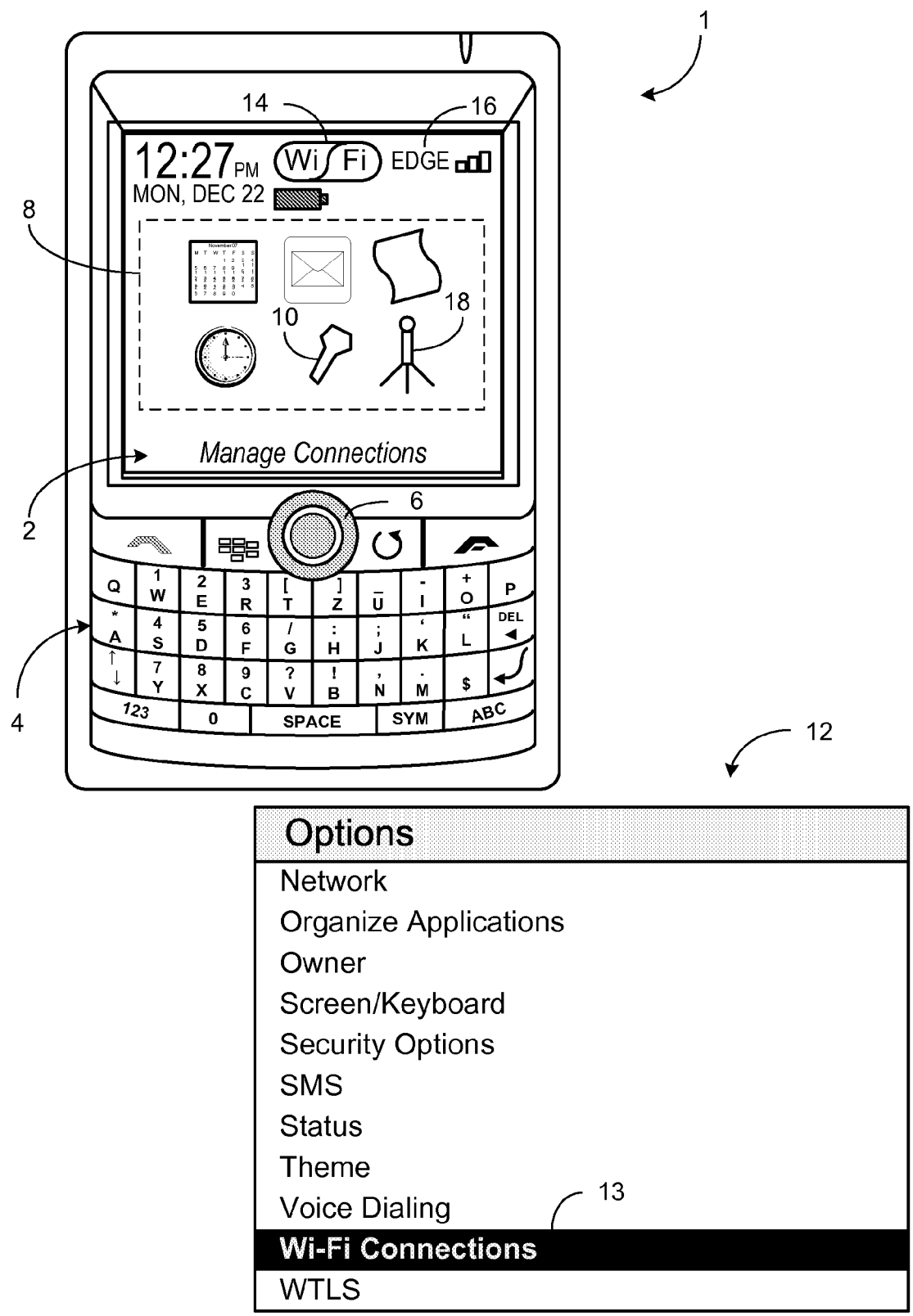
FIG. 1 is an illustration of an exemplary handheld device.

FIG. 1 is an illustration of an exemplary handheld device 1. Device 1 has a display 2 and user input components such as a keyboard 4 and a trackball 6. Device 1 is equipped with a WLAN wireless communication interface for connecting to Wi-Fi networks, and is a WLAN client device.

Optionally, device 1 is also equipped with additional wireless communication interfaces, for example, a wireless wide area network (WWAN) communication interface for connecting to mobile networks and a wireless personal area network (WPAN) communication interface for connecting to a WPAN. A non-exhaustive list of mobile phone and data standards for WWANs includes 2G standards such as Global System for Mobile Communications (GSM) and Code Division Multiple Access (CDMA), 2.5G standards such as General Packet Radio Service (GPRS), 2.75G standards such as CDMA2000 and Enhanced Data rates for GSM Evolution (EDGE), and 3G standards such as Wideband CDMA (W-CDMA). Bluetooth® networks, Zigbee™ and ultra-wideband (UWB) networks are examples of WPANs.

Device 1 also comprises other components which for clarity are not shown in FIG. 1. The following description is based on an exemplary graphical user interface. Clearly, the functionality of the exemplary screens described below can be implemented using other graphical user-interface elements than those shown.

An exemplary home screen, which is the screen displayed in display 2 when device 1 is first turned on, is shown in FIG. 1. Icons representing applications of device 1 are displayed in a list 8. By navigating through list 8, a user of device 1 may select an icon 10 representing an options application. If the user selects icon 10, an options application will be launched. The screen may then show a window 12 listing a partial or entire list of options that the user can view and/or edit.

By navigating to and selecting the "Wi-Fi Connections" option 13, a WLAN profile management application will be launched.

Figure 2:
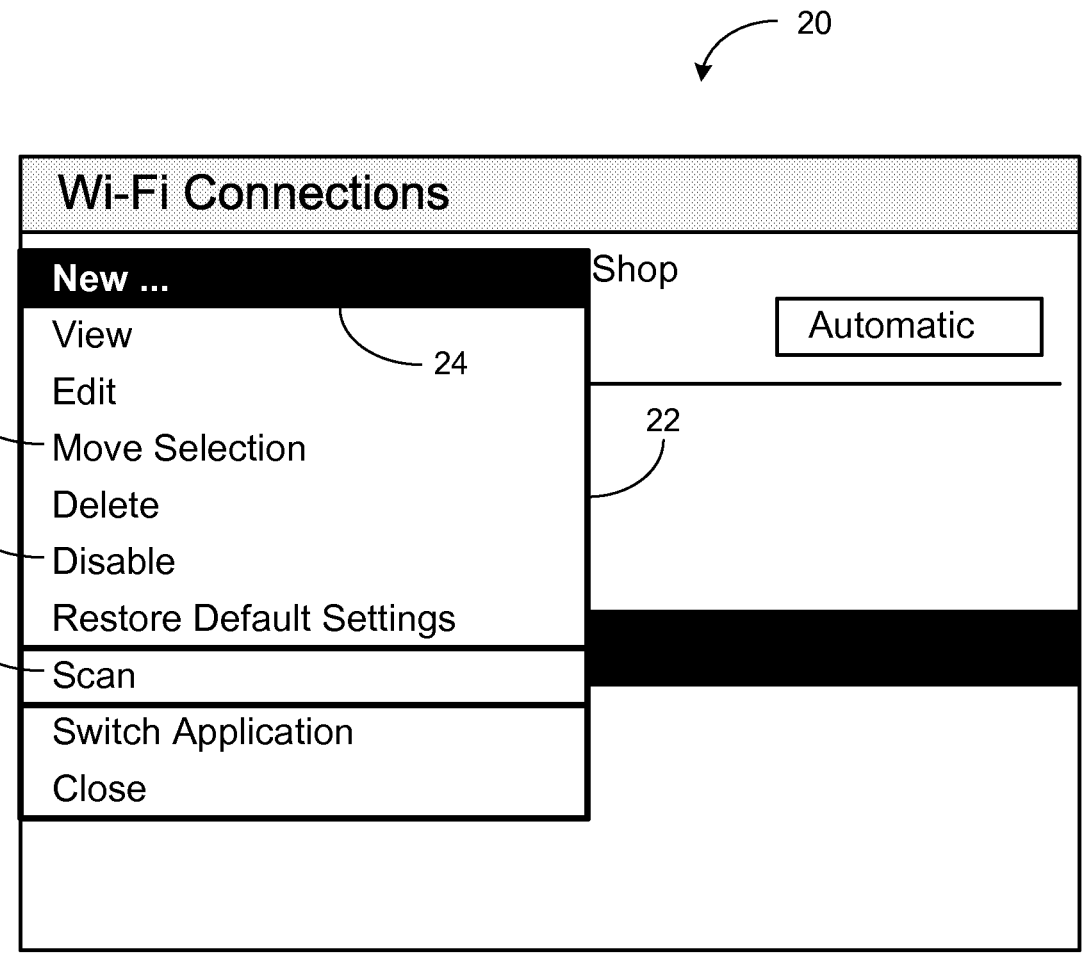
FIG. 2 is an illustration of an exemplary screen shown when a wireless local area network profile management application is launched and an exemplary menu associated with the application is opened by a user of the handheld device.

FIG. 2 is an illustration of an exemplary screen 20 shown when the WLAN profile management application is launched and an exemplary menu 22 of commands associated with the application is opened by the user. Screen 20 and menu 22 are described in more detail below with respect to FIGS. 12-1 and 12-2. Selecting a menu item 24 entitled "New . . . " from menu 22 will launch a WLAN connection setup application.

WLAN Connection Setup Application

Figure 3:
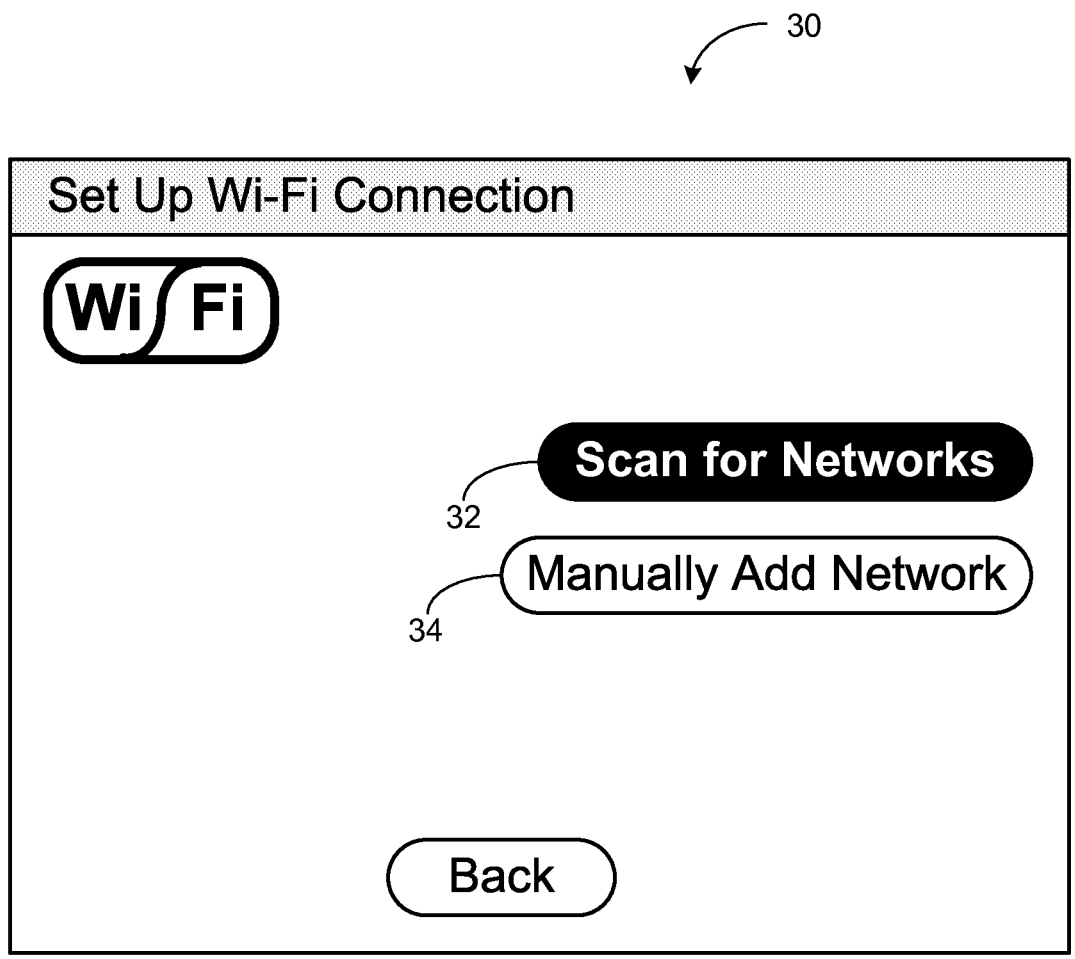
FIG. 3 is an illustration of an exemplary screen which may appear when a WLAN connection setup application is launched.

FIG. 3 is an illustration of an exemplary screen 30 which may appear when the WLAN connection setup application is launched. Screen 30 includes a button 32 entitled "Scan for Networks" and a button 34 entitled "Manually Add Network".

If button 32 is selected, scanning for wireless local area networks will commence. Device 1 may employ passive scanning techniques, active scanning techniques or any combination thereof.

Figures 1, 4:
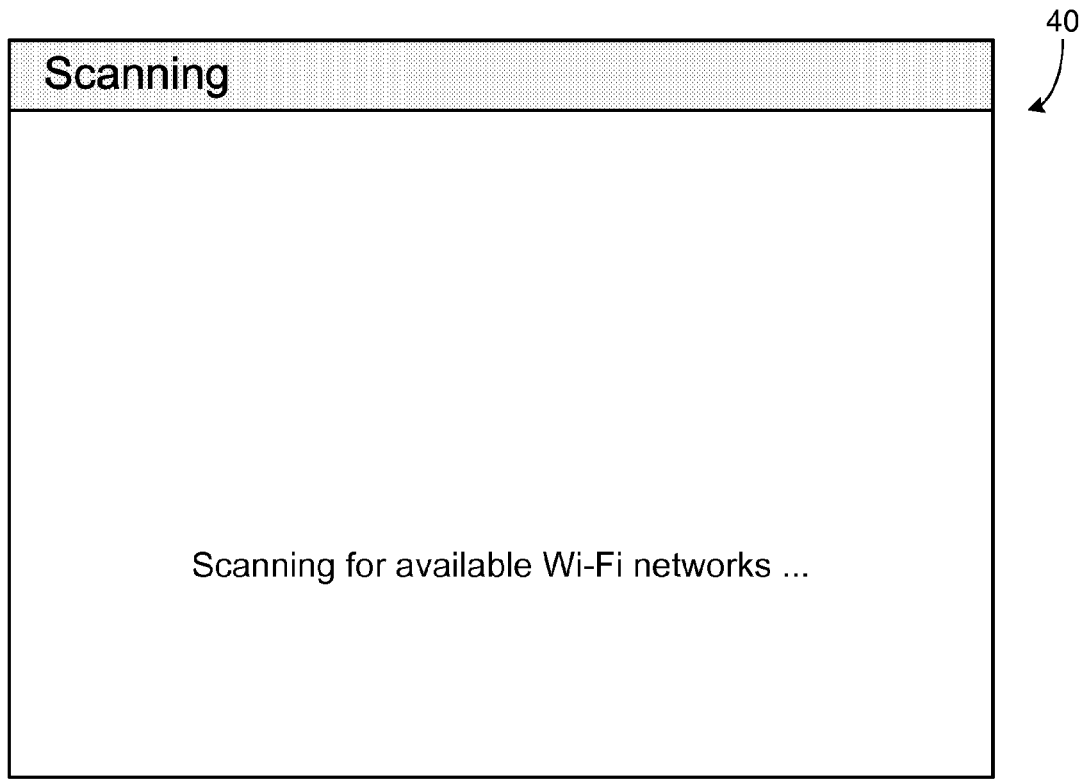
Figures 2, 4:
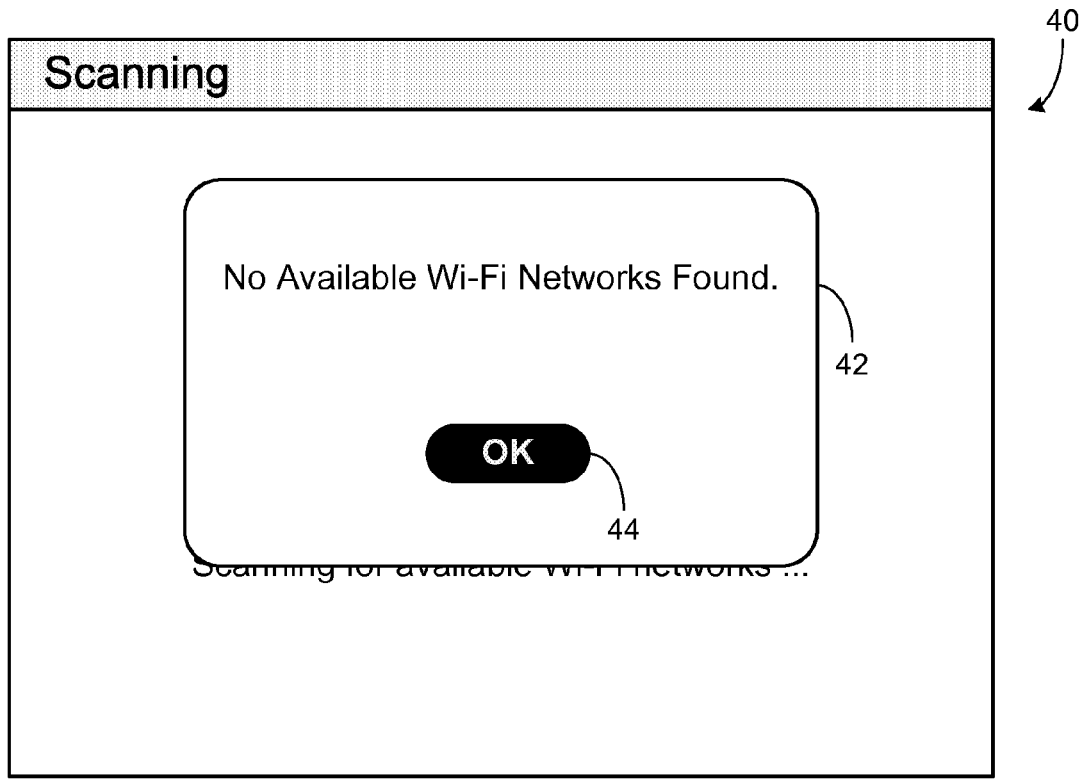

FIG. 4-1 is an illustration of an exemplary screen 40 which may appear while the device is scanning for available WLANs. If no available WLANs are found, a popup window 42 informing the user of this may appear, as shown in FIG. 4-2. If the user presses an OK button 44, the user will be presented again with screen 30.

FIGS. 5-1, 5-2, and 5-3 are illustrations of an exemplary screen 50 listing the results of the scanning. All available wireless local area networks that have been identified during scanning are listed. If the number of available networks exceeds that which can be viewed simultaneously, a scrollbar 51 may be used to scroll through the entire list.

In the example shown in FIGS. 5-1, 5-2, and 5-3, six different available wireless local area networks are listed. WLANs for which a persistent connection profile is saved in device 1 are identified in the list by connection profile name (e.g. "Home", "Coffee Shop") and WLANs for which a connection profile is not saved in device 1 are identified in the list by network name (e.g. "Rosencrantz", "Guildenstern", "Symbol"). WLANs for which a connection profile is saved in device 1 are further identified by the description "Saved", except for a WLAN to which device 1 is currently connected, if any. If device 1 is currently connected to a WLAN, that WLAN is displayed first in the list, regardless of its signal strength as perceived by device 1. The WLAN to which device 1 is currently connected may be further identified by the text description "Connected" or by a visual indicator 52, for example, a graphic, or by both. The text description and the visual indicator are displayed near an identifier of the WLAN to which the WLAN client device is currently connected. In this example, visual indicator 52 is a checkmark.

Available WLANs to which device 1 is not currently connected are displayed in the list ordered by decreasing received signal strength at device 1. Each available wireless local area network appears in the list with a visual indicator 53 of its signal strength as perceived by device 1. In this example, visual indicator 53 is a graphic of a radio tower broadcasting radio waves. The size and number of radio waves is indicative of the signal strength, which may be abstracted to three values: high, medium and low. In the example shown in FIGS. 5-1, 5-2 and 5-3, the WLAN to which device 1 is currently connected, identified by its connection profile name "Coffee Shop", is listed first even though it has a lower received signal strength than the WLAN identified by its network name "Rosencrantz".

Device 1 may identify the security configurations of the available WLANs from the scan results. For example, device 1 may identify whether the security configuration of the WLAN is none, Wired Equivalent Privacy (WEP), PSK (also known as "WPA-Personal") or IEEE 802.1X (also known as "WPA-Enterprise"). Each available wireless local area network for which a connection profile is not saved in device 1 appears in the list with a description of its security requirements (e.g. "No Security", "Security: WEP", "Security: WPA-Personal", "Security: WPA-Enterprise"). For anything other than "No Security", a visual indicator 54 of its security requirements is also displayed. In this example, visual indicator 54 is a graphic of a lock. In alternative implementations, different visual indicators could be used to indicate different security requirements.

As will be described in further detail below, device 1 may save a connection profile as a persistent connection profile or as a transient connection profile. Visual indicators may be employed to distinguish available WLANs for which transient connection profiles are saved in device 1 from available WLANs for which a persistent connection profile is saved in device 1. For example, the WLAN may appear in the list identified by its connection profile name (e.g. "Temporary") and its network name (e.g. "Proxim"), concatenated into a single string. Moreover, that string may be displayed in italicized text.

Navigating to and selecting a particular available WLAN in the list will indicate that the user wants to have device 1 connect to the selected WLAN. If no security is required by the selected WLAN, device 1 may directly attempt to connect to the select WLAN, as described below with respect to FIG. 7. If security credentials are required, the user will be prompted to supply security credentials for the selected WLAN, as described below with respect to FIGS. 6-1, 6-2, 6-3, 6-4, 6-5, 6-6, 6-7, 6-8, 6-9 and 6-10.

Figures 1, 5:
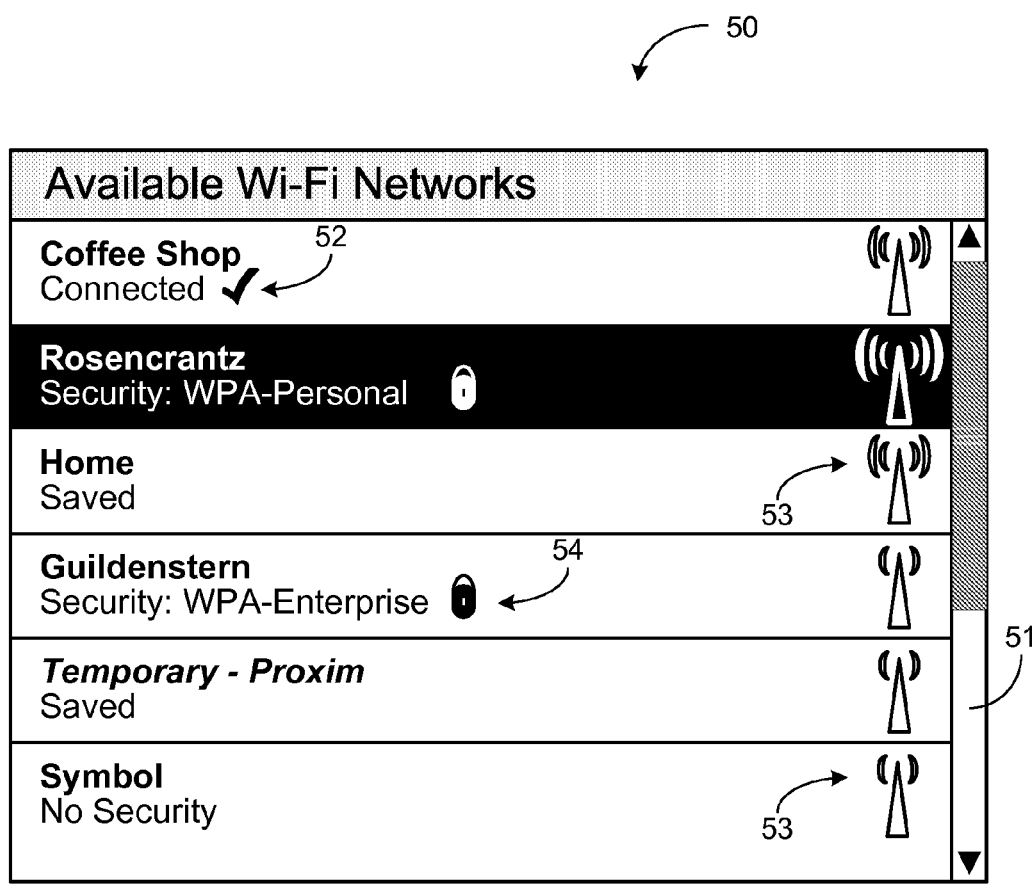
Figures 2, 5:
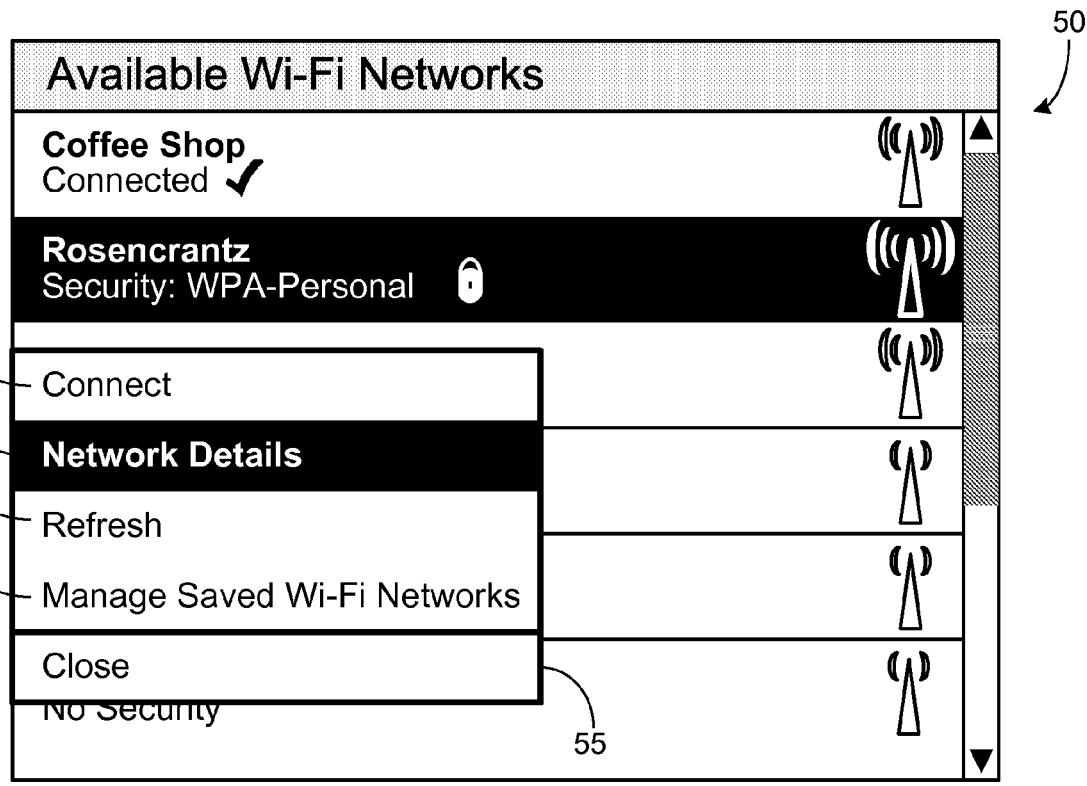
Figures 3, 5:
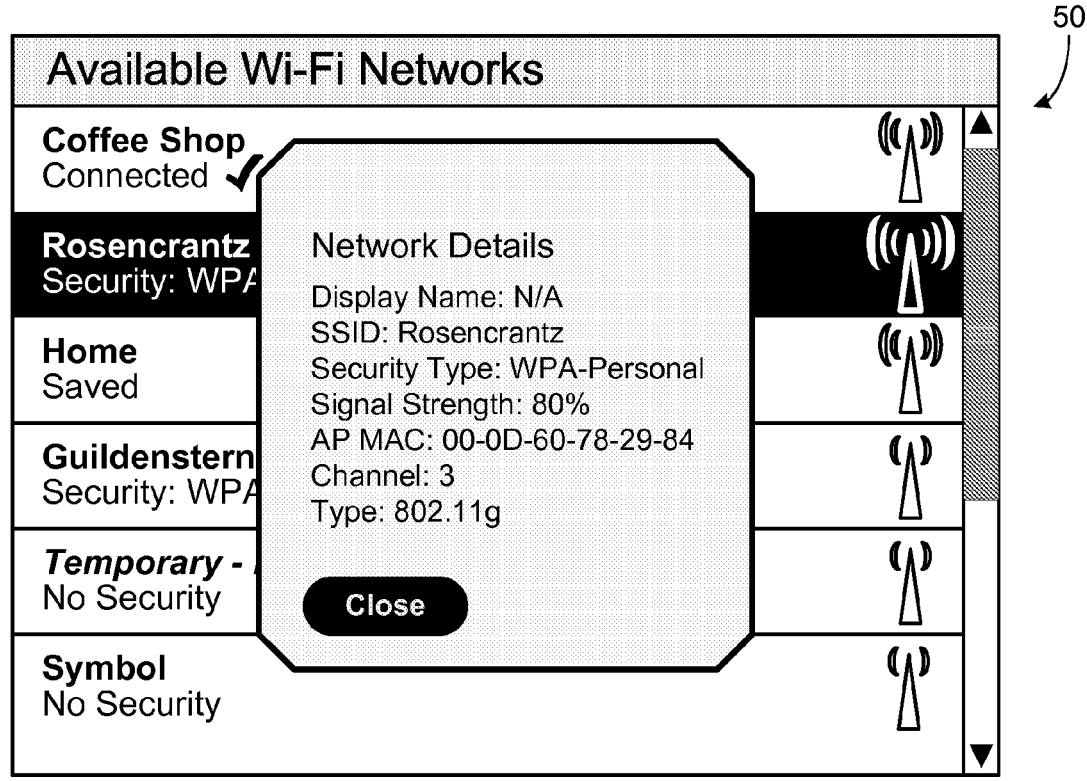
Figures 4, 5:
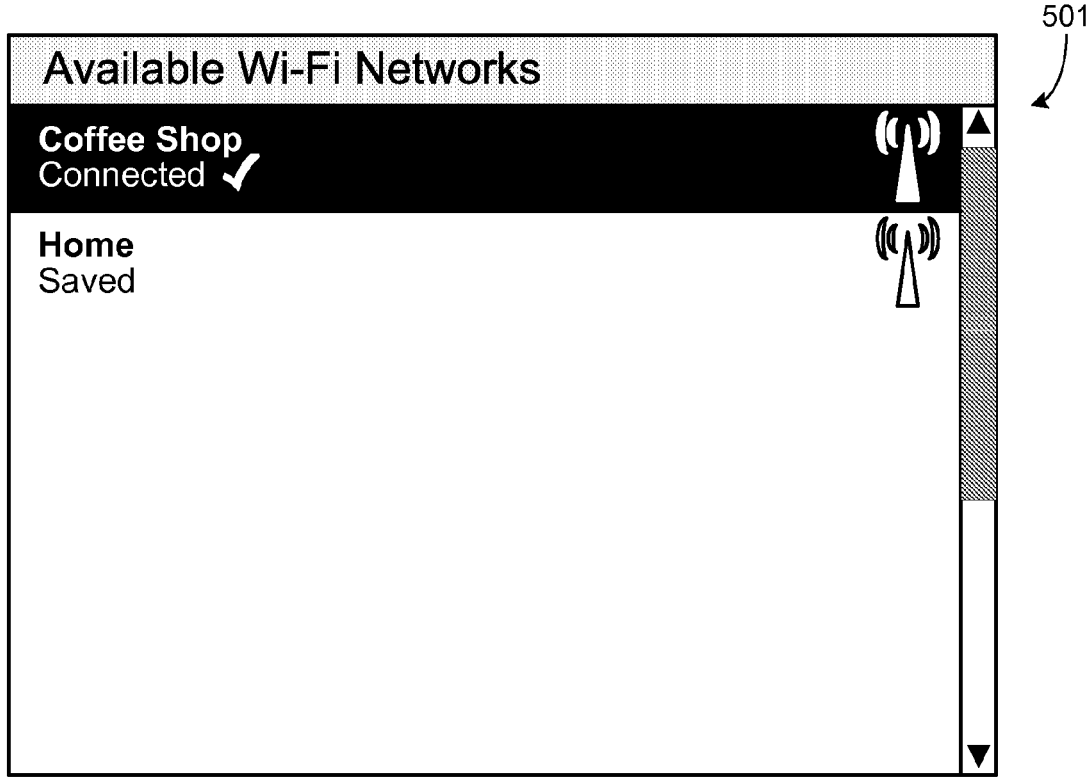
Figure 5:
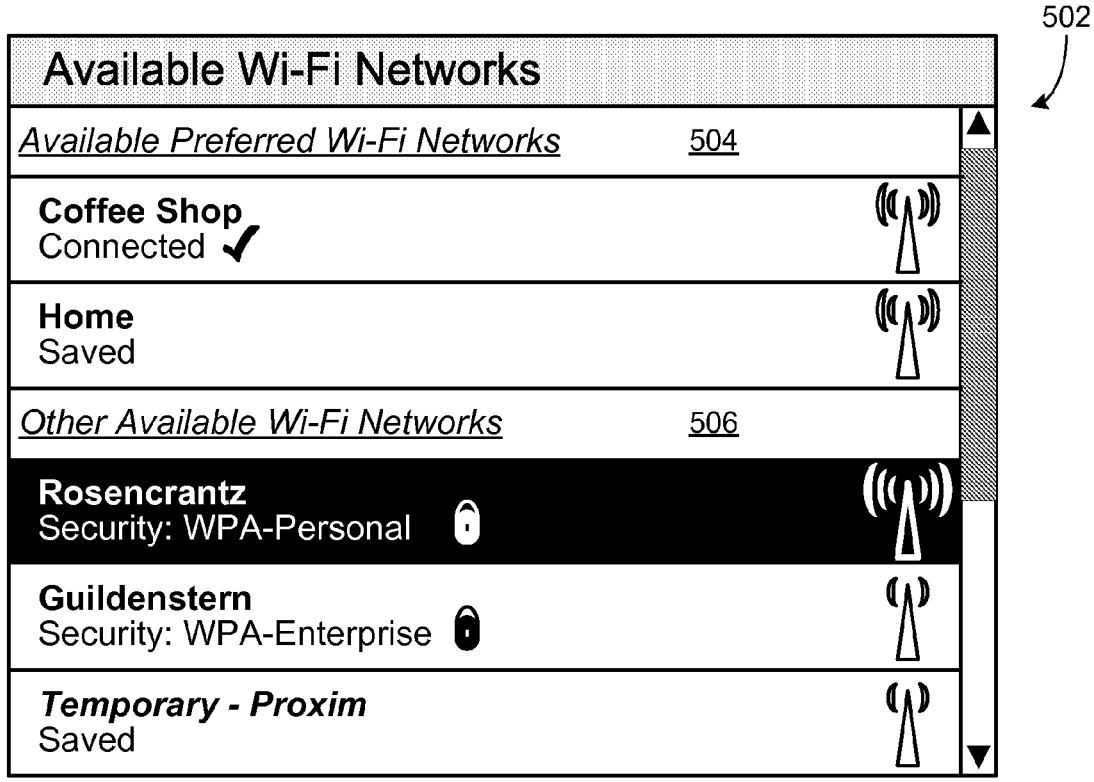

FIG. 5-2 illustrates a view of screen 50 in which a menu 55 associated with screen 50 is opened by the user. Navigating to a particular available WLAN in the list and then selecting a menu item 56 entitled "Connect" has the same effect as selecting the list item. Navigating to a particular available WLAN in the list and then selecting a menu item 57 entitled "Refresh" will cause device 1 to scan again for wireless local area networks, as described above. Navigating to a particular available WLAN in the list and then selecting a menu item 58 entitled "Manage Saved Wi-Fi Networks" will launch the WLAN profile management application, which is described in more detail below with respect to FIGS. 12-1 and 12-2.

Navigating to a particular available WLAN in the list and then selecting a menu item 59 entitled "Network Details" will result in a popup window being shown with details of the particular available WLAN, as shown in FIG. 5-3. In this example, the user has selected the available WLAN with the network name "Rosencrantz", which has the strongest signal strength.

Preferred Connection Profiles

A user of device 1 may be able to designate one or more connection profiles of WLANs saved in the device as "preferred". For example, when creating a connection profile of a WLAN, there may be a check box or radio button or other graphical user-interface element that enables the designation of the connection profile as preferred. In another example, menu 22 associated with the WLAN profile management application may include a menu item (not shown) the text of which toggles between "Preferred" if a selected connection profile is not designated as preferred and "Not Preferred" if the selected connection profile is designated as preferred. Selecting that menu item will toggle the preferred/not preferred status of the selected connection profile. Other user interface means for enabling designation of one or more connection profiles as preferred or not preferred are also contemplated.

When displaying the results of scanning, available wireless local area networks matching preferred connection profiles may be treated differently than other available wireless local area networks. In one aspect, scan results may be filtered so that only matches to preferred connection profiles are displayed at the device. For example, the connection profiles named "Coffee Shop" and "Home" may have been designated as preferred and the results of the scanning may be such that there are available WLANs matching those connection profiles. As illustrated in FIG. 5-4, a screen 501 of available WLANs may display only those available WLANs that match one of the preferred connection profiles. To accomplish this, device 1 may include in a list of available WLANs those available WLANs for which a preferred connection profile is saved in device 1, and device 1 may exclude from the list any other available WLANs. Device 1 may then display the list or a portion thereof on its display.

In another aspect, a displayed list of available WLANs may distinguish in the list available WLANs for which a preferred connection profile is saved in device 1 from other available WLANs in the list. For example, the connection profiles named "Coffee Shop" and "Home" may have been designated as preferred and the results of the scanning may be such that there are available WLANs matching those connection profiles. As illustrated in FIG. 5-5, a screen 502 displaying a list of available WLANs may include a first sublist of available WLANs for which a preferred connection profile is saved in device 1 and a second sublist of the other available WLANs. The first sublist may include a header 504 that identifies the available WLANs in the sublist as preferred, and the second sublist may include a header 506 that is different than header 504.

One or more of the aspects of displaying a list of available WLANs that are described above with respect to FIGS. 5-1, 5-2 and 5-3 may also be applicable to the list of only those available WLANs that match one of the preferred connection profiles. Likewise, one or more of the aspects of displaying a list of available WLANs that are described above with respect to FIGS. 5-1, 5-2 and 5-3 may also be applicable to a list that distinguishes between available WLANs that match one of the preferred connection profiles and other available WLANs, and may be applicable to the first sublist, the second sublist or both.

FIGS. 6-1, 6-2, 6-3, 6-4, 6-5, 6-6, 6-7, 6-8, 6-9 and 6-10 are illustrations of an exemplary screen 60 for user input of security credentials for a wireless local area network. If device 1 has identified the selected WLAN as having a PSK security configuration, screen 60 will appear as in FIG. 6-1, with editable text fields 61 and 62 to enable the user to input a password. This is the case for the example with the selected WLAN having the network name "Rosencrantz".

Figures 1, 6:
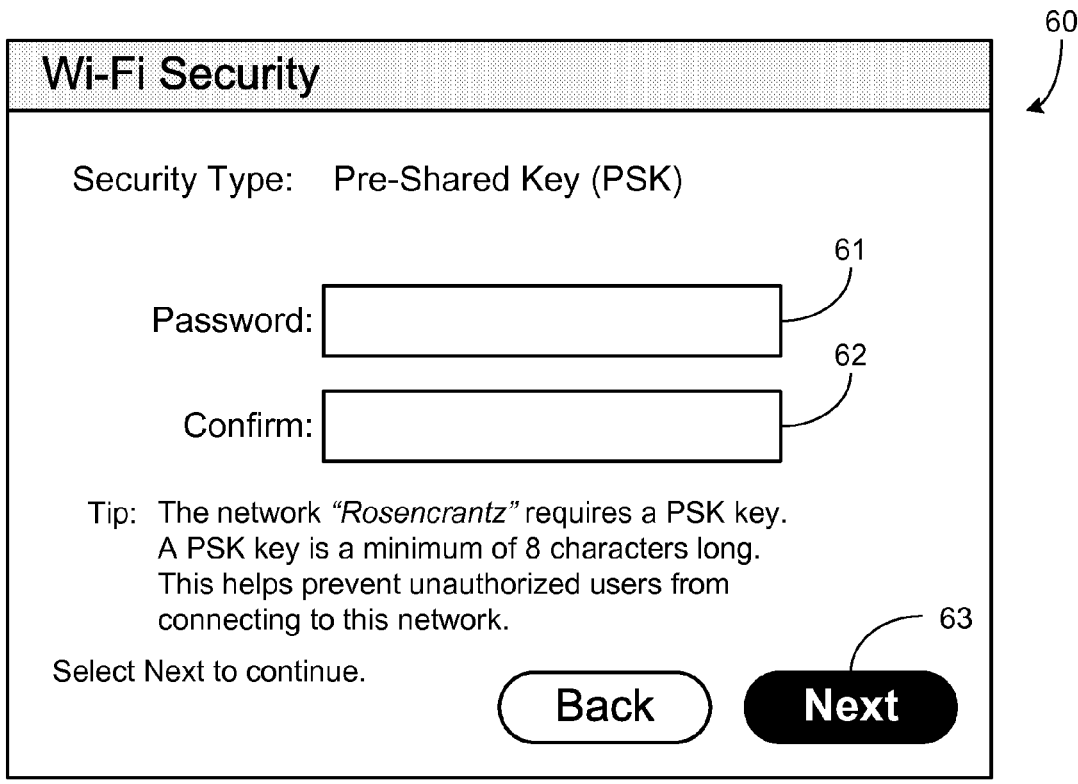
Figures 2, 6:
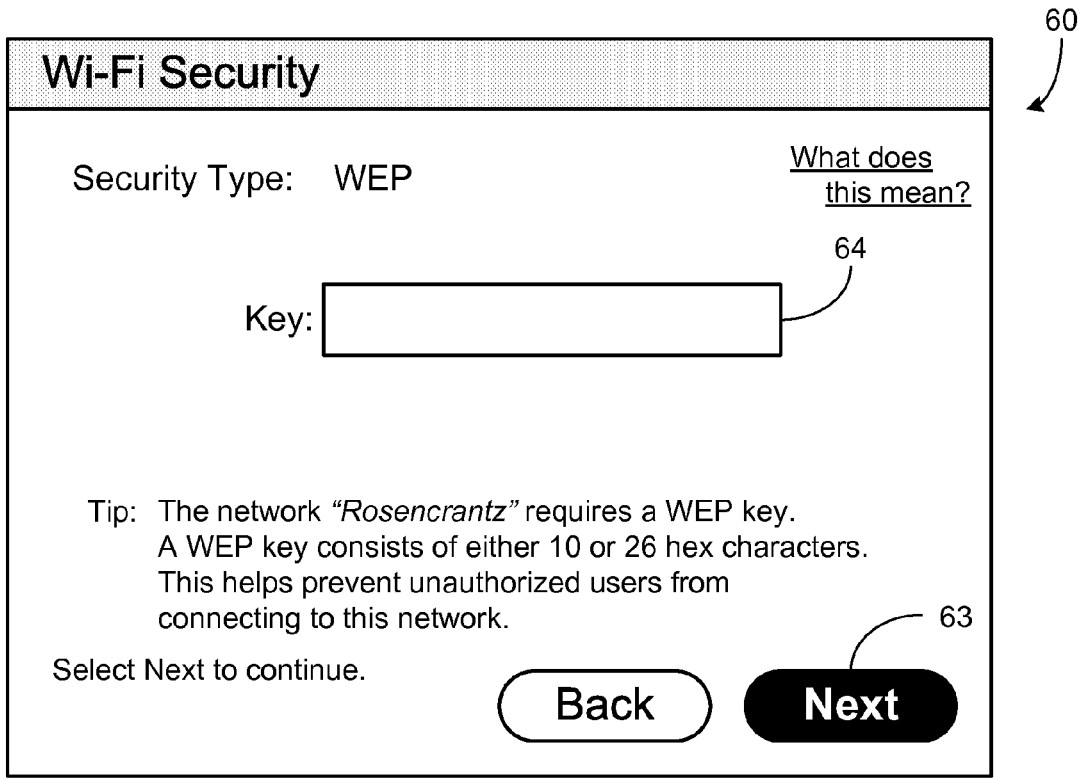
Figures 3, 6:
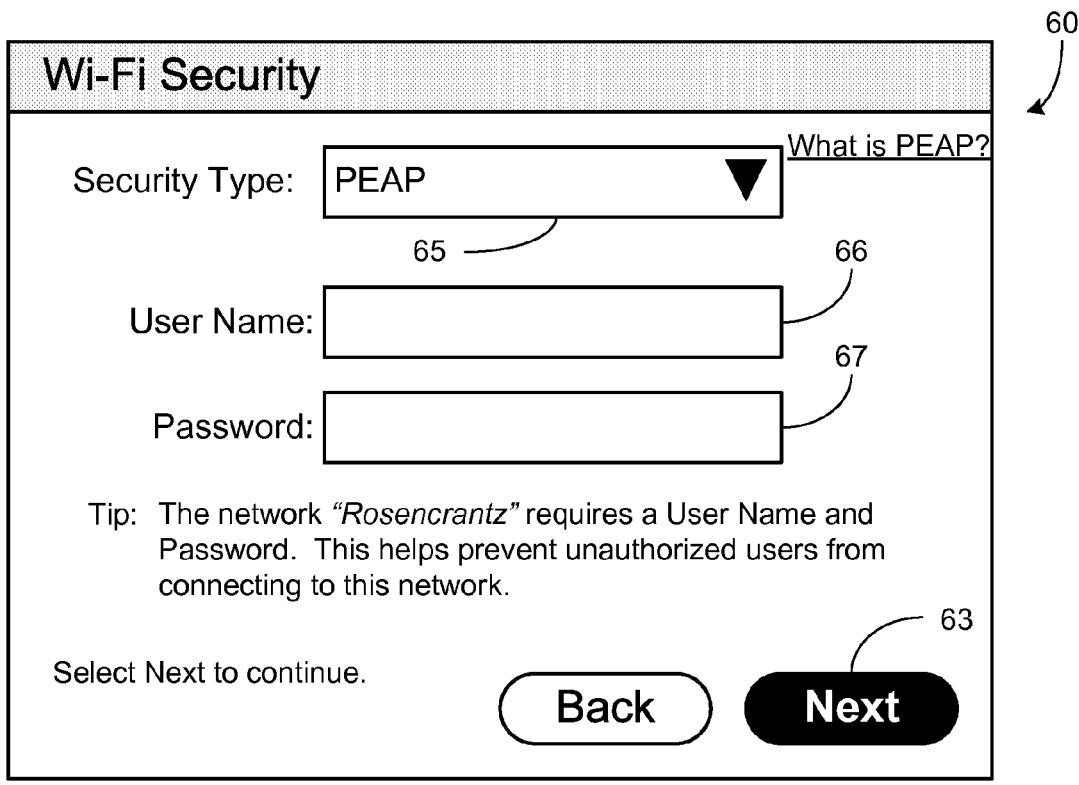
Figures 4, 6:
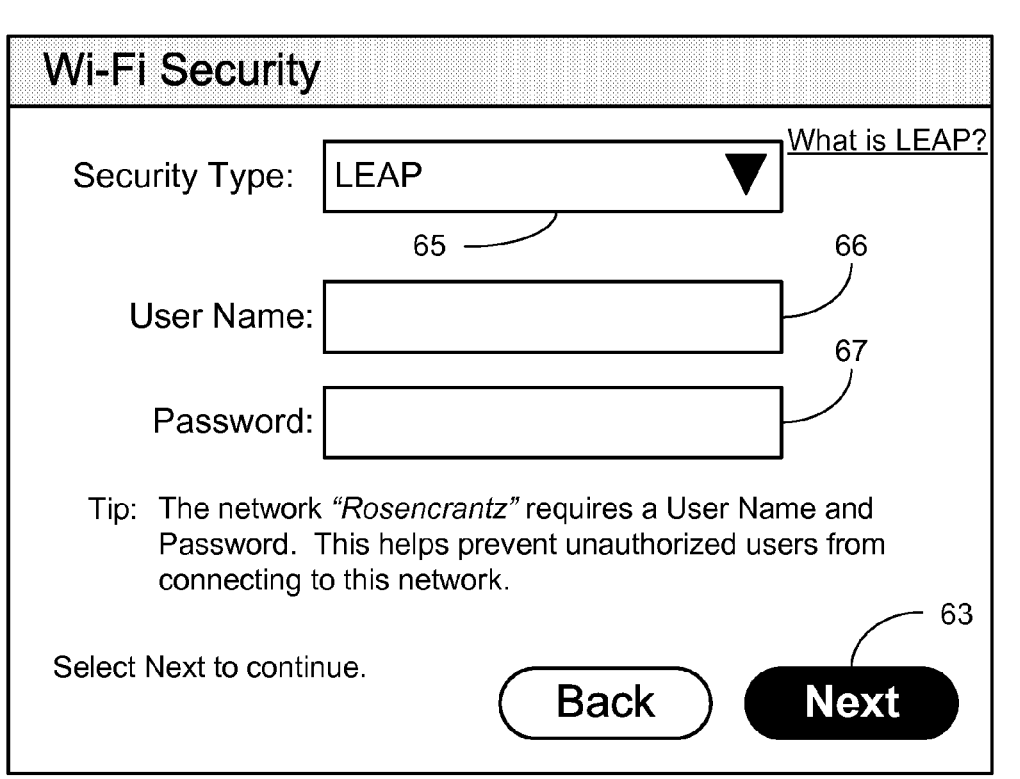
Figures 5, 6:
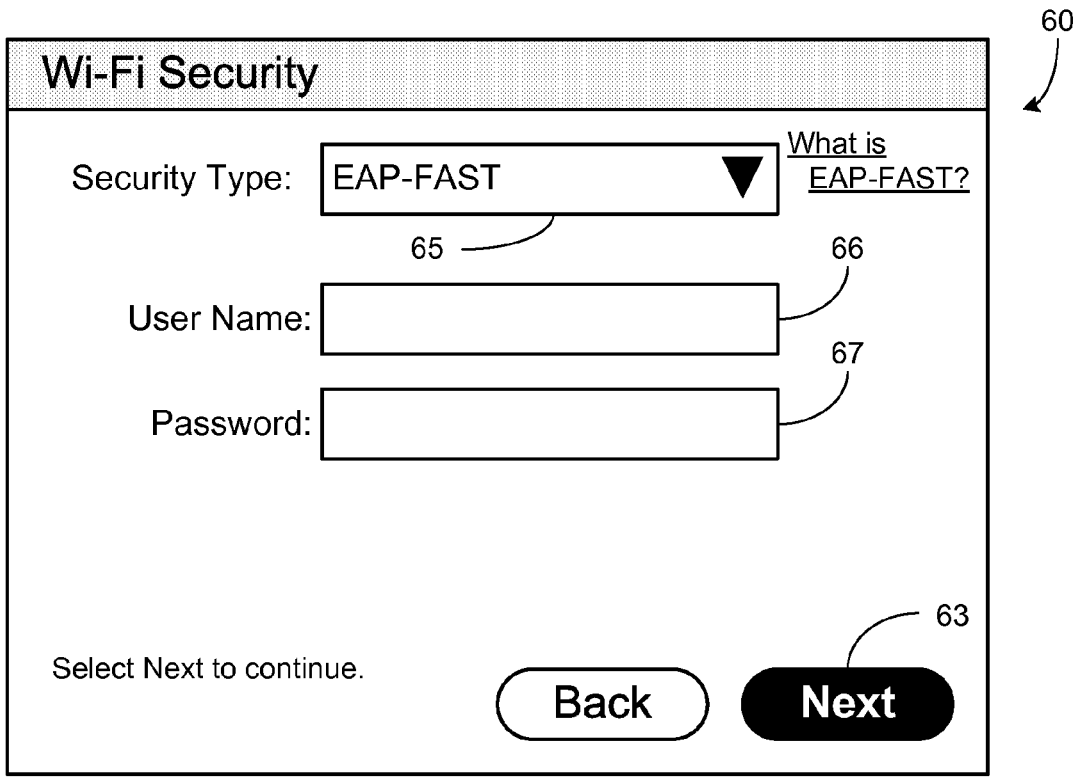
Figure 6:
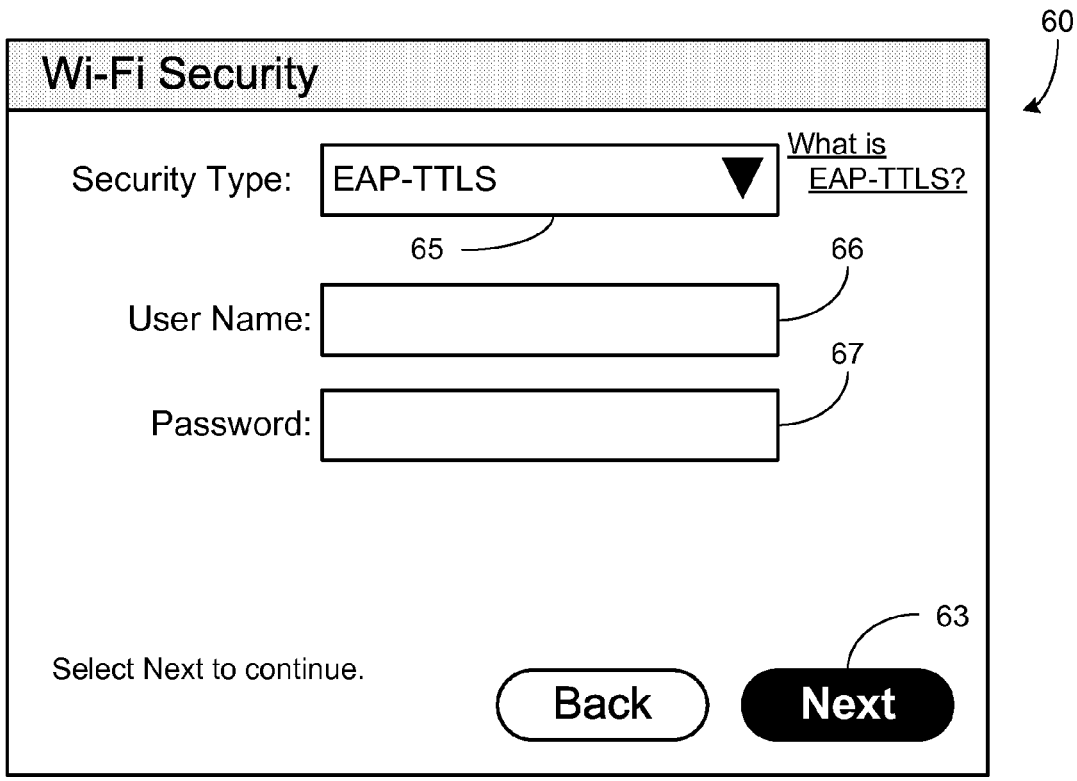

If device 1 has identified the selected WLAN as having a WEP security configuration, screen 60 will appear as in FIG. 6-2, with an editable text field 64 to enable the user to input a WEP key.

If device 1 has identified the selected WLAN as having an IEEE 802.1X security configuration, but is unable to identify which Extensible Authentication Protocol (EAP) is being used, screen 60 will appear as in one of FIGS. 6-3, 6-4, 6-5, 6-6, 6-7, 6-8, 6-9 and 6-10, with a drop-down menu 65 of EAP-based security types.

Figures 6, 7:
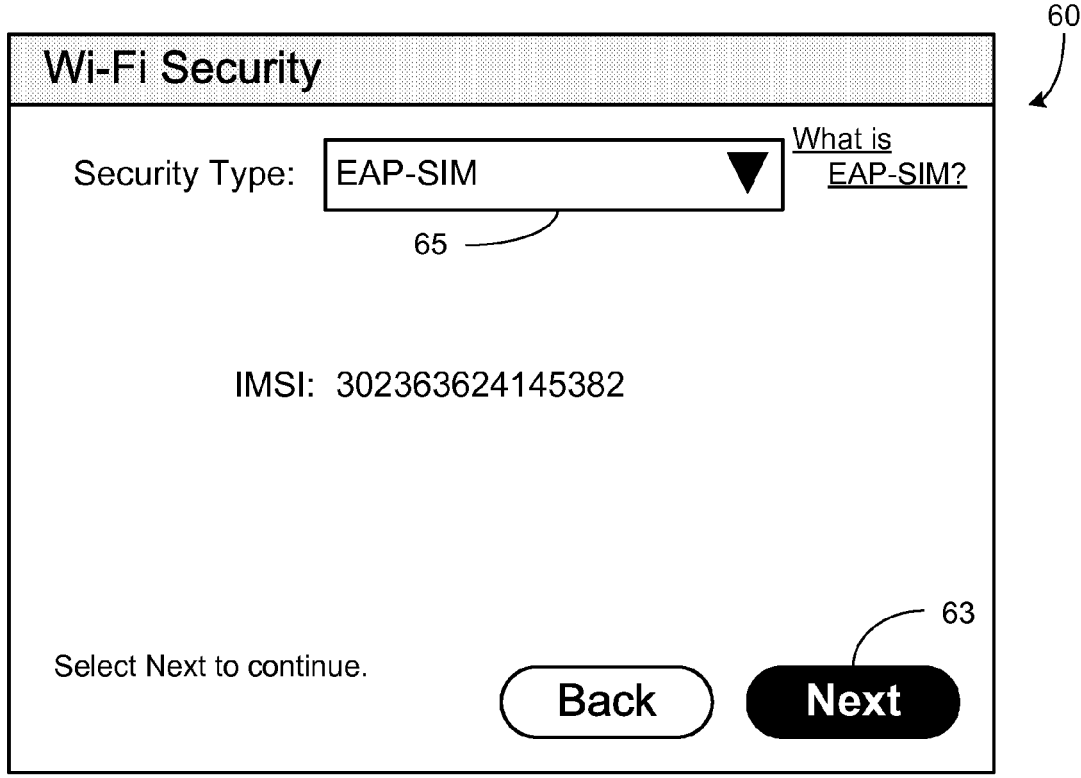
Figures 6, 7, 8:
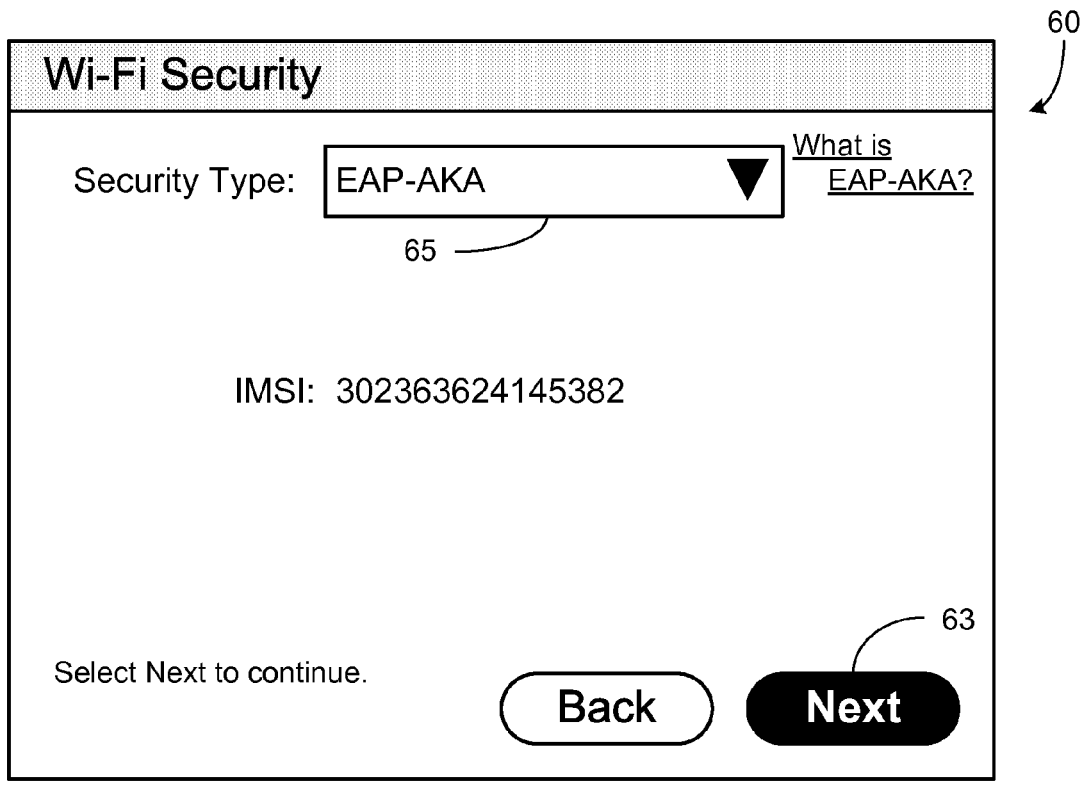

In FIGS. 6-3, 6-4, 6-5, and 6-6, editable text fields 66 and 67 enable the user to input a user name and password. In FIGS. 6-7 and 6-8, the International Mobile Subscriber Identity (IMSI) of device 1 is displayed. In FIG. 6-9, a client certificate stored in device 1 is displayed. If more than one client certificate is stored in device 1, then as shown in FIG. 6-10, screen 60 includes a drop-down menu 68 listing the client certificates.

All of FIGS. 6-1, 6-2, 6-3, 6-4, 6-5, 6-6, 6-7, 6-8, 6-9 and 6-10 have a button 63 entitled "Next", which when selected by the user will cause device 1 to attempt to connect to the selected WLAN, using the security credentials provided in screen 60.

FIG. 7 is an illustration of an exemplary screen 70 which may appear while the device is attempting to connect to the selected WLAN. Upon successfully connecting to a WLAN, device 1 obtains an Internet Protocol (IP) address. If device 1 successfully connects to the selected WLAN and a connection profile of the selected WLAN is already saved in device 1, then screen 70 closes and, returning briefly to FIG. 1, an icon 14 is displayed in home screen 2. Icon 14 indicates to the user that the device is connected to a WLAN.

If device 1 successfully connects to a WLAN for which a connection profile is not saved in device 1, a connection profile screen may be displayed. FIGS. 8-1 and 8-2 are illustrations of an exemplary screen 80 which may appear if the attempt to connect to the WLAN is successful and a connection profile is not saved for the WLAN. The user is asked whether to save the connection information (e.g. SSID, security credentials, other information gleaned from the scan result or the connection process) in a persistent connection profile. By saving a persistent connection profile, the user will not need to reenter the security credentials when connecting to this WLAN in the future. A "Yes"/"No" toggle button 81 is displayed. An editable text field 82 enables the user to input a name for the persistent connection profile. If button 81 is set to "Yes", selecting a button 83 entitled "Next" causes device 1 to attempt to create a persistent connection profile for the newly connected WLAN with the connection profile name provided in text field 82. In this example, the user has provided the connection profile name "Suzie's Home" for the WLAN with the network name "Rosencrantz".

If a connection profile with that connection profile name is already saved in device 1, a popup window 84 as shown in FIG. 8-2 is displayed to inform the user of this and to enable the user to select, via a "Yes" button 85 or a "No" button, whether to replace the existing connection profile. If the user selects "Yes", then device 1 creates a persistent connection profile for the newly connected WLAN with the connection profile name provided by the user. If the user selects "No", popup window 84 disappears and the user is able to provide a different connection profile name via editable text field 82.

If device 1 is unable to connect to the WLAN because the security credentials provided in one of FIGS. 6-1, 6-2, 6-3, 6-4, 6-5, 6-6, 6-7, 6-8, 6-9 and 6-10 does not match the requirements of the WLAN, then the user is informed of this, for example, via a screen 86 as shown in FIG. 8-3. Selecting a button 87 entitled "Back" will bring the user back to one of FIGS. 6-1, 6-2, 6-3, 6-4, 6-5, 6-6, 6-7, 6-8, 6-9 and 6-10. In another implementation, instead of screen 86, a popup window with a single button may be displayed over screen 70.

If device 1 is unable to connect because it is out of the coverage area of the WLAN, then the user is informed of this, for example, via a screen 88 as shown in FIG. 8-4. Screen 88 differs from screen 80 only in that a description 89 explaining that the device is out of the coverage area is displayed. By saving a persistent connection profile, the user will not need to reenter the security credentials when connecting to this WLAN in the future. This is helpful even in the situation where the user was unable to connect to the WLAN due to being out of the coverage area of the WLAN. If button 81 is set to "Yes", selecting button 83 entitled "Next" causes device 1 to attempt to create a persistent connection profile for the newly connected WLAN with the connection profile name provided by the user. As with screen 80, if a connection profile with that connection profile name is already saved in device 1, popup window 84 will be displayed.

If, in screen 80 or screen 88, toggle button 81 is set to "No", selecting button 83 entitled "Next" may cause device 1 to attempt to create a transient connection profile. A transient connection profile differs from a persistent connection profile in that its name is not chosen at creation by the user, and a transient connection profile has a limited lifetime. After a period of time, for example, 24 hours, a transient connection profile may be automatically deleted from the device without any user intervention. Alternatively, a transient connection profile may be stored in the device until overwritten with another transient connection profile. Persistent connection profiles, on the other hand, generally require user intervention in order to be deleted from the device.

Consider the situation where a user is in an area of WLAN coverage for a short period of time, for example, at an airport lounge. The user may choose not to save a persistent connection profile for the WLAN, knowing that he/she is not intending to be in that location for a long time. However, by saving a transient connection profile, if the device becomes disconnected from the WLAN, attempts to reconnect to the WLAN will be easier and require less intervention from the user, than if no connection information for the WLAN is stored in the device.

Transient connection profiles may be automatically assigned connection profile names, for example, "Temporary 1", "Temporary 2", etc. The SSID of the WLAN may be incorporated into the connection profile name of the transient connection profile.

If creation of the connection profile, whether persistent or transient, is successful, the device will proceed to display the next screen.

In alternate implementations, if in screen 80 or screen 88 select button 81 is set to "No", selecting button 83 entitled "Next" may cause device to proceed to the next screen without creating any connection profile.

Figures 6, 7, 8, 9:
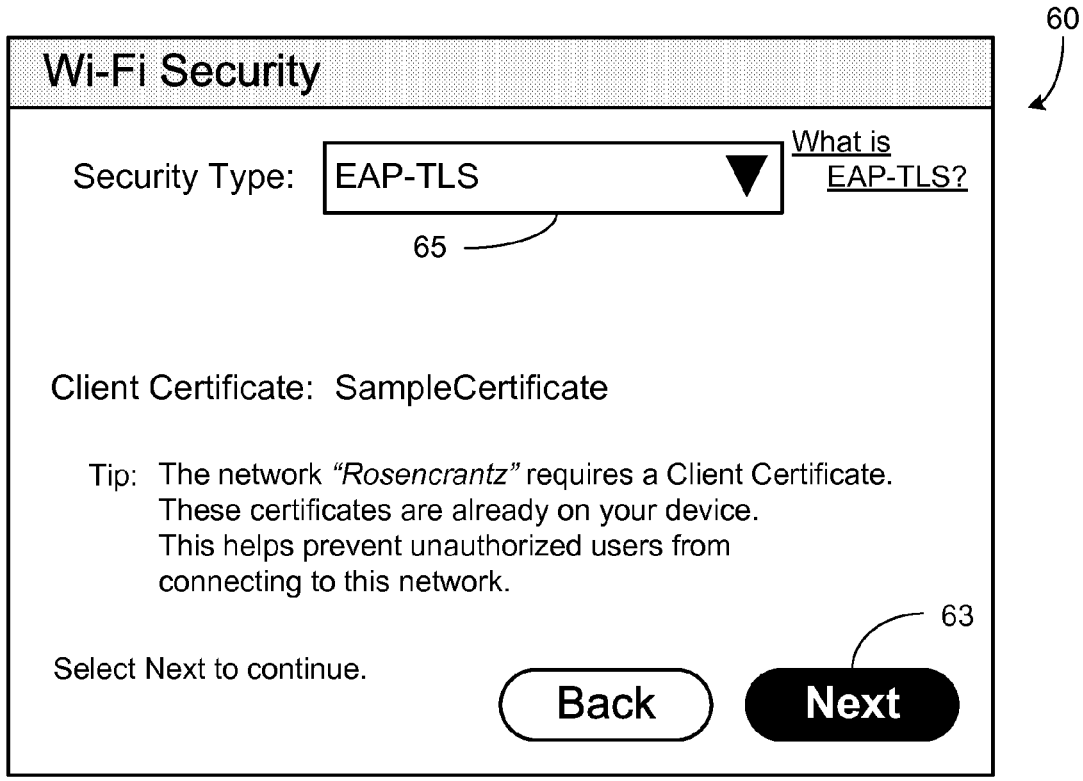
Figures 6, 7, 8, 9, 10:
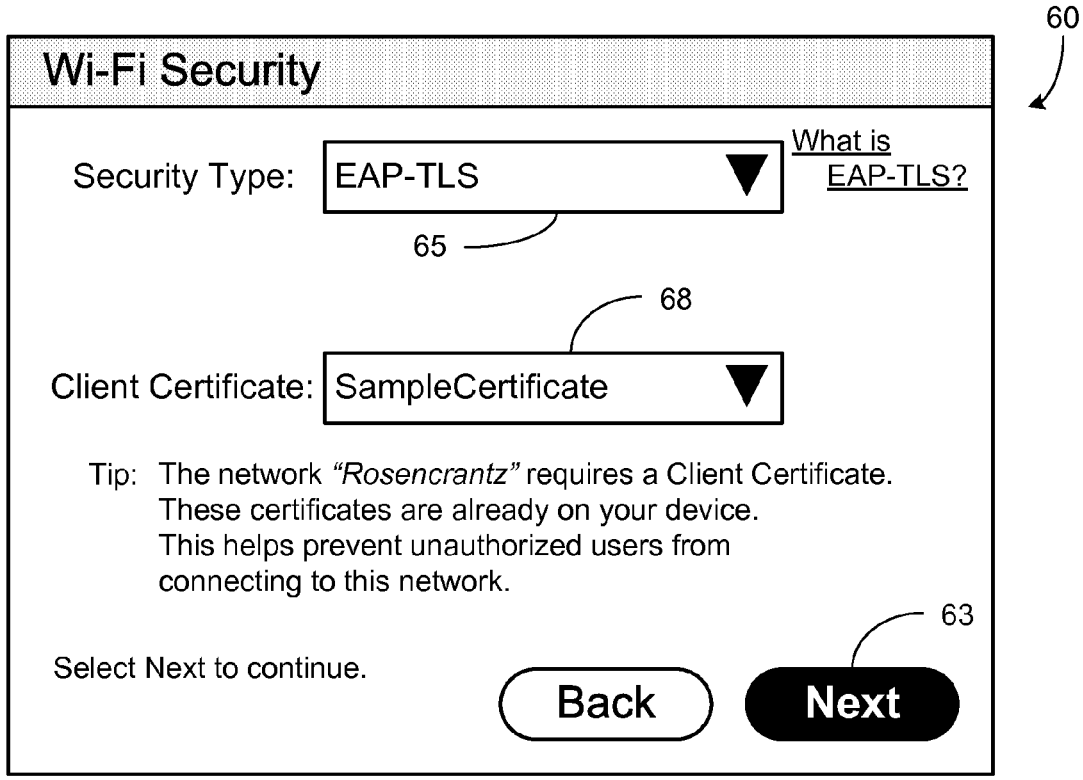
Figure 7:
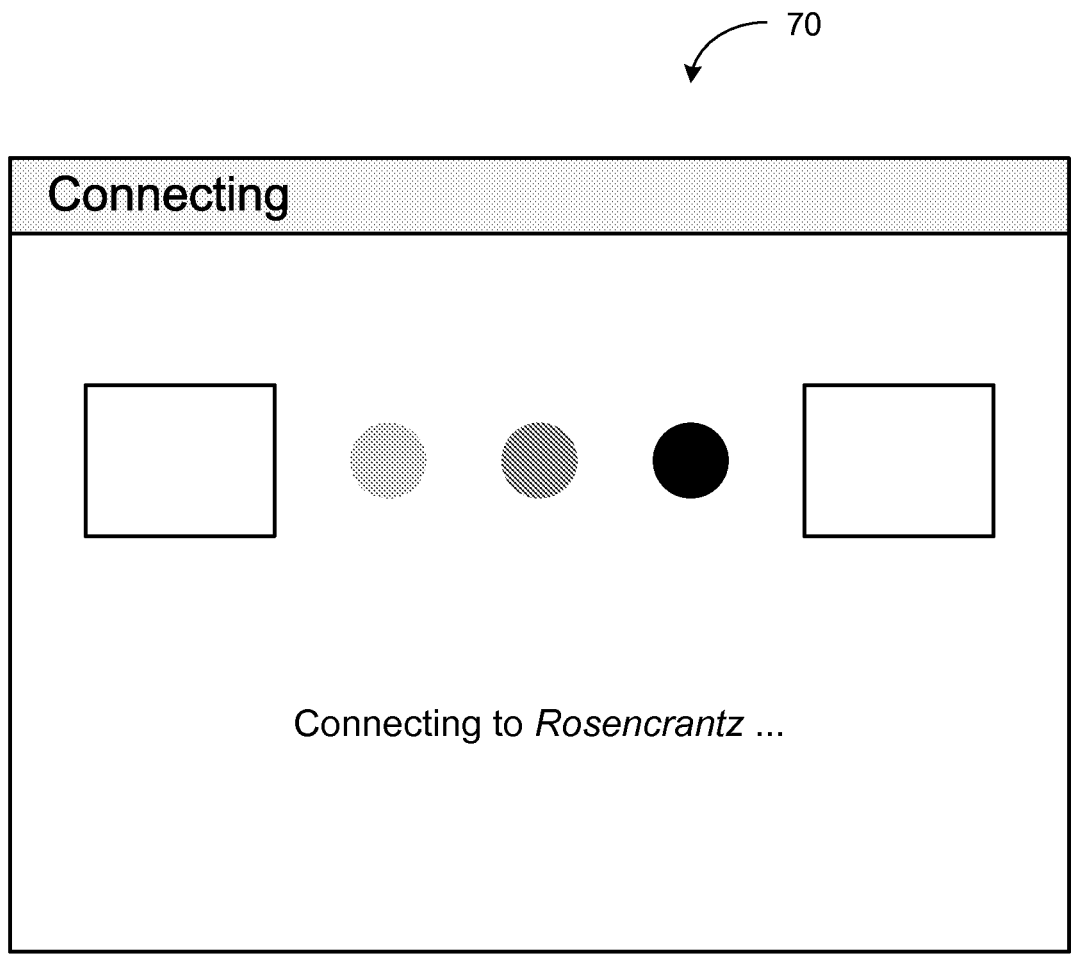
Figures 1, 8:
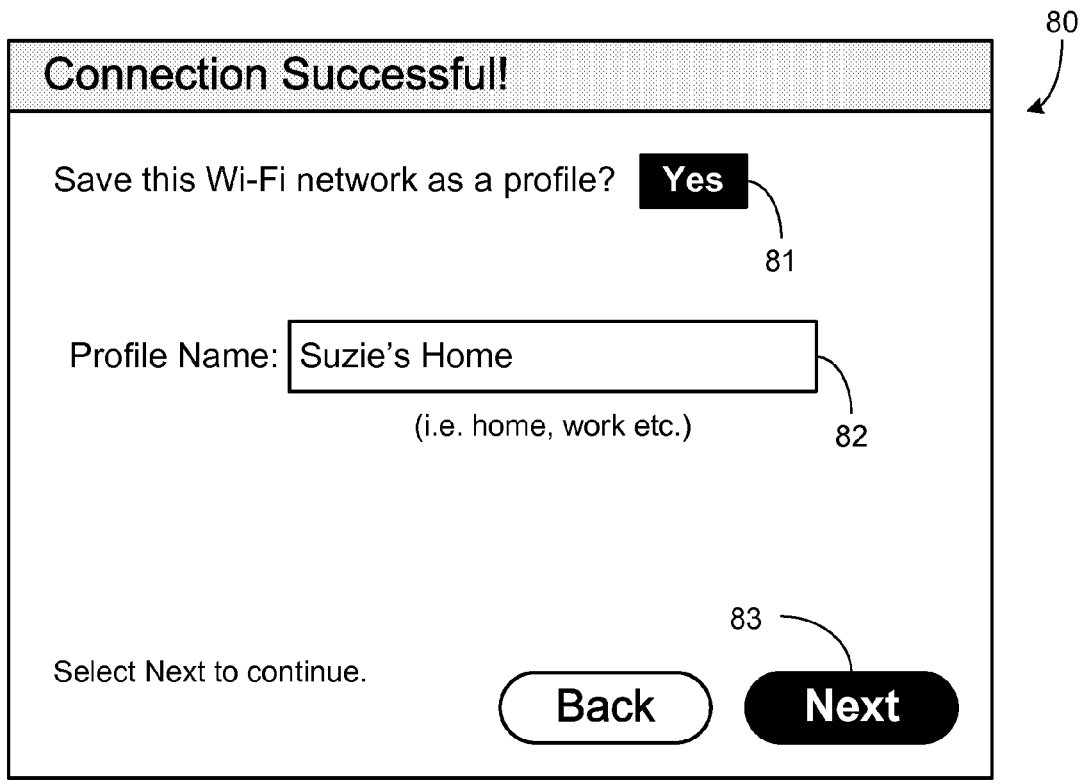
Figures 2, 8:
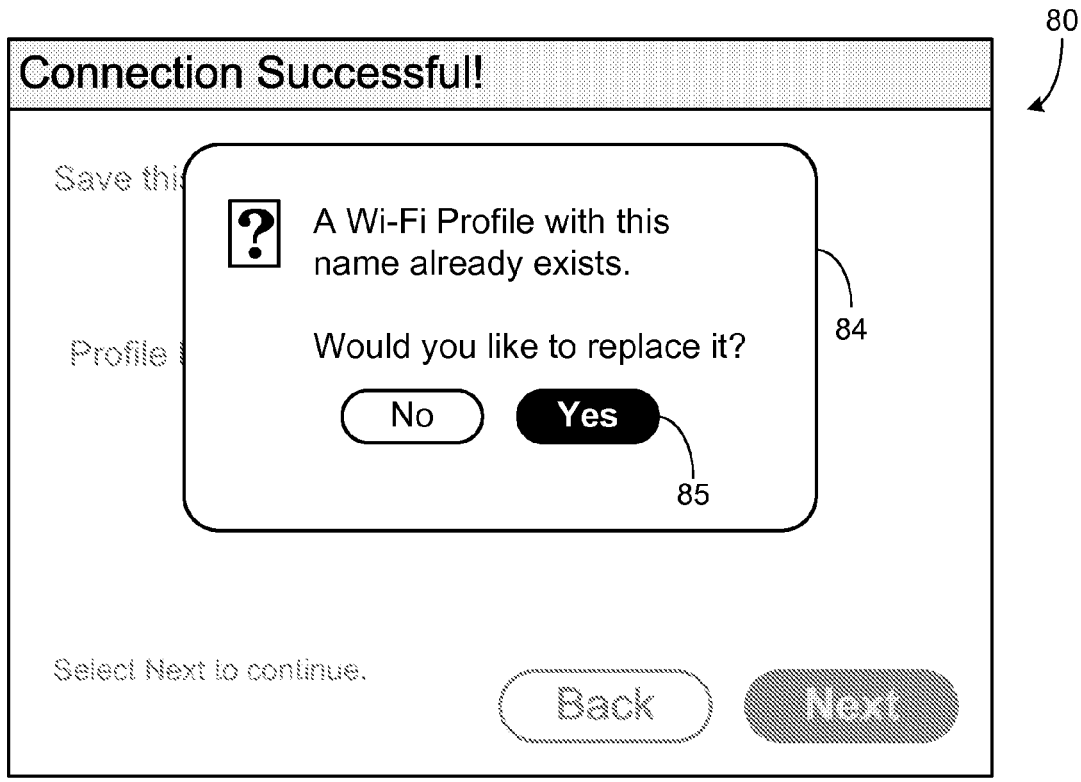
Figures 3, 8:
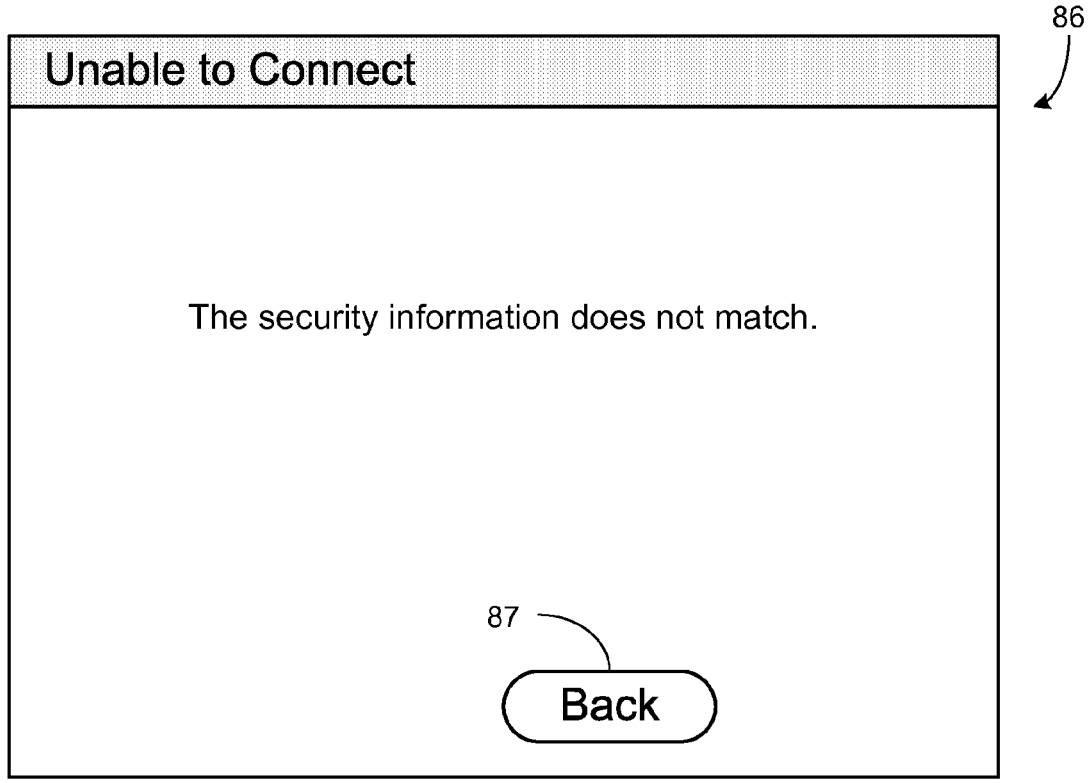
Figures 4, 8:
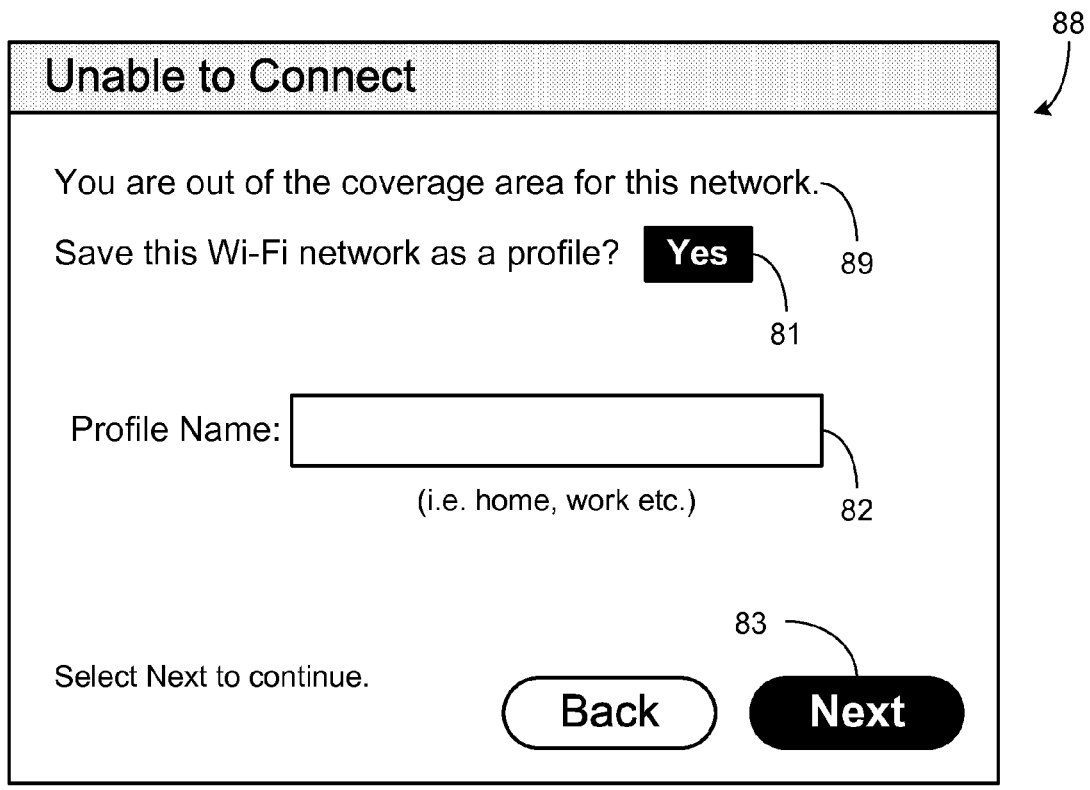
Figures 1, 9:
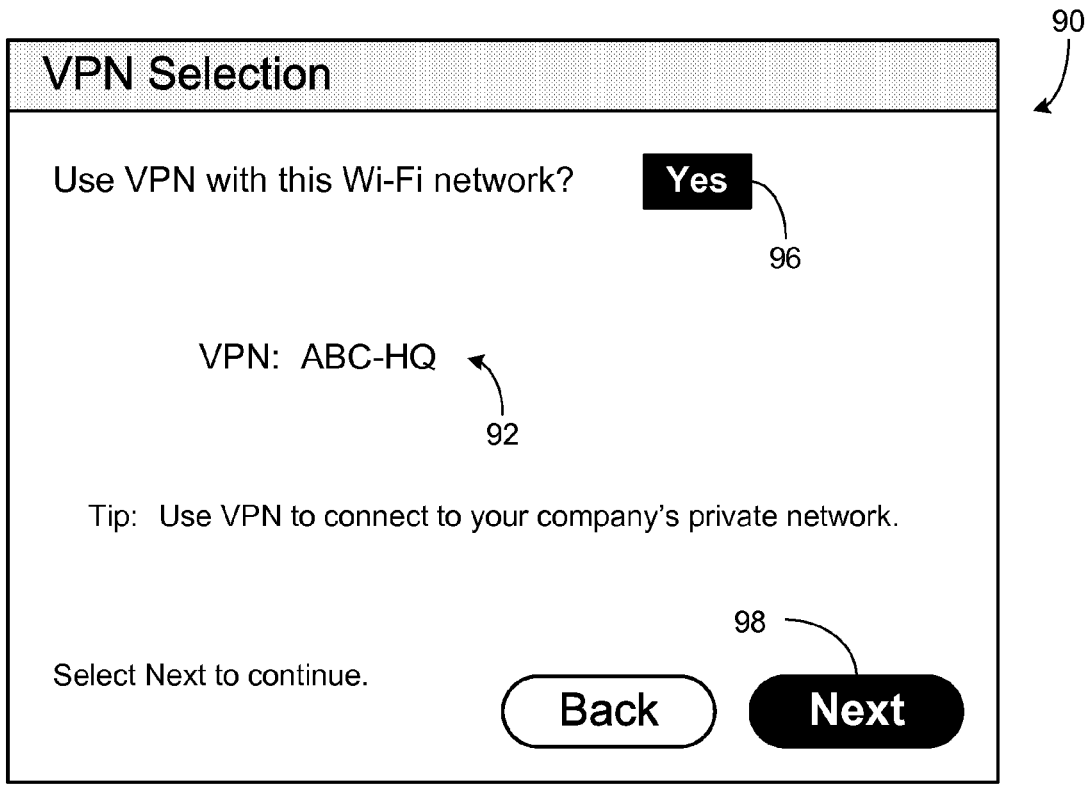
Figures 2, 9:
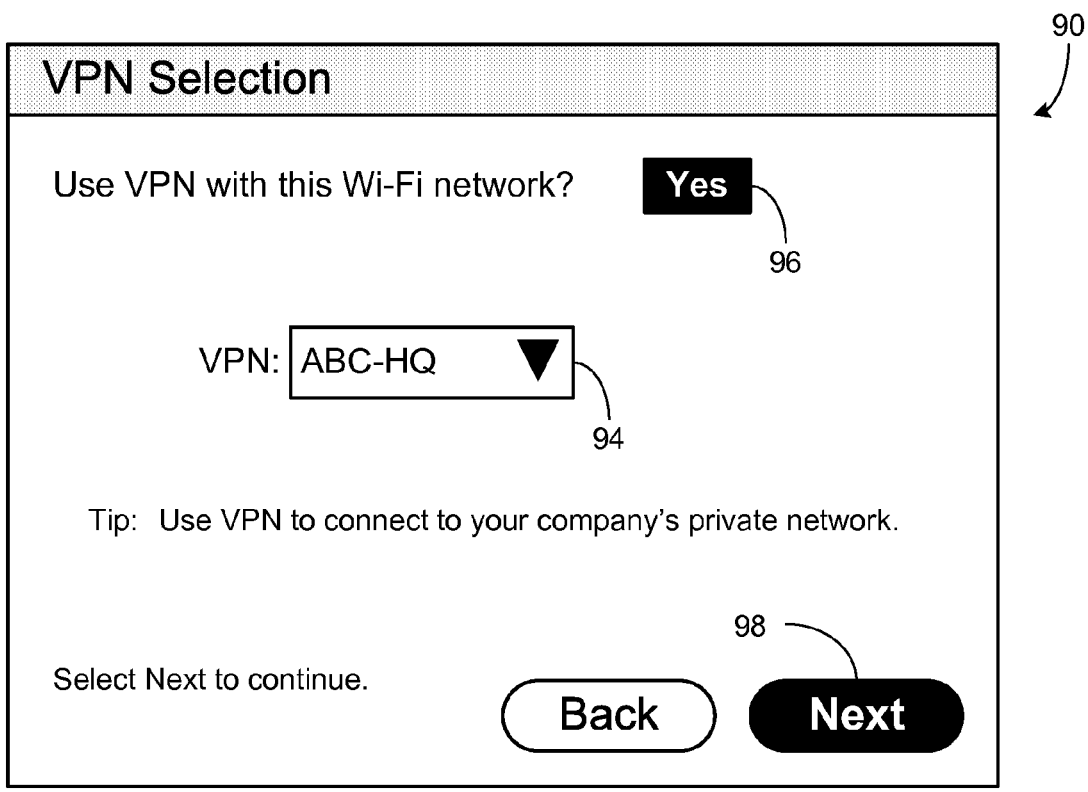
Figures 1, 10:
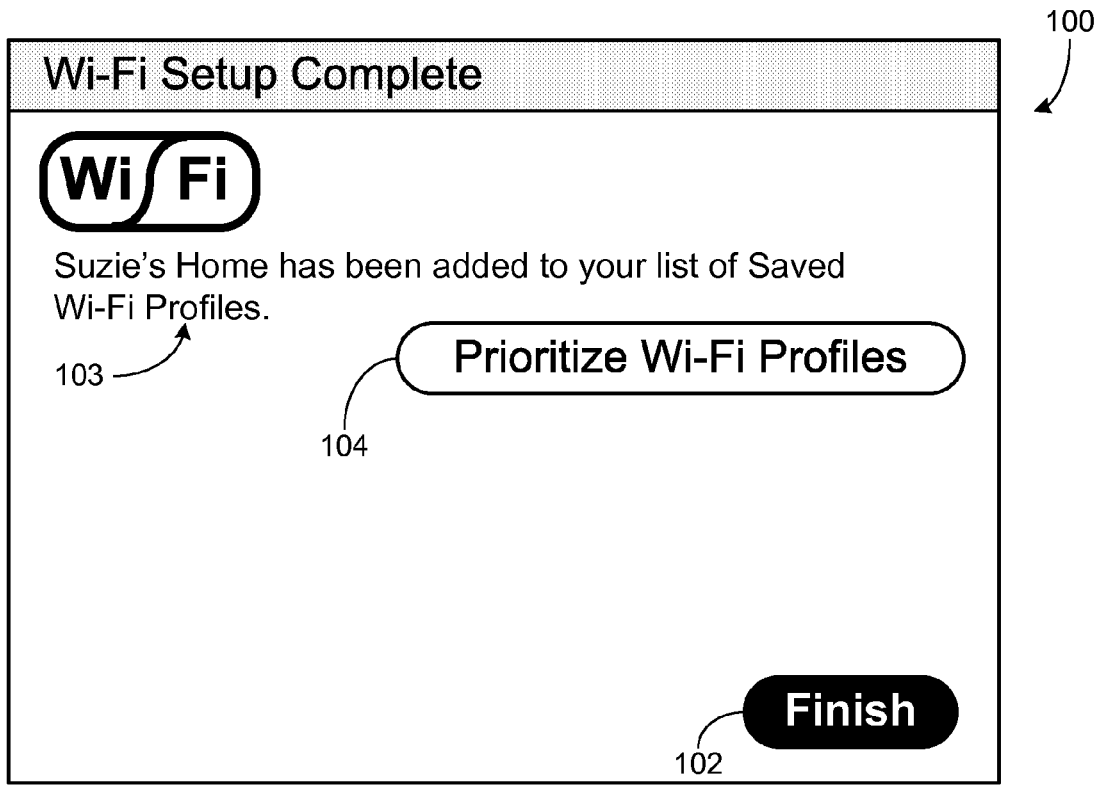
Figures 2, 10:
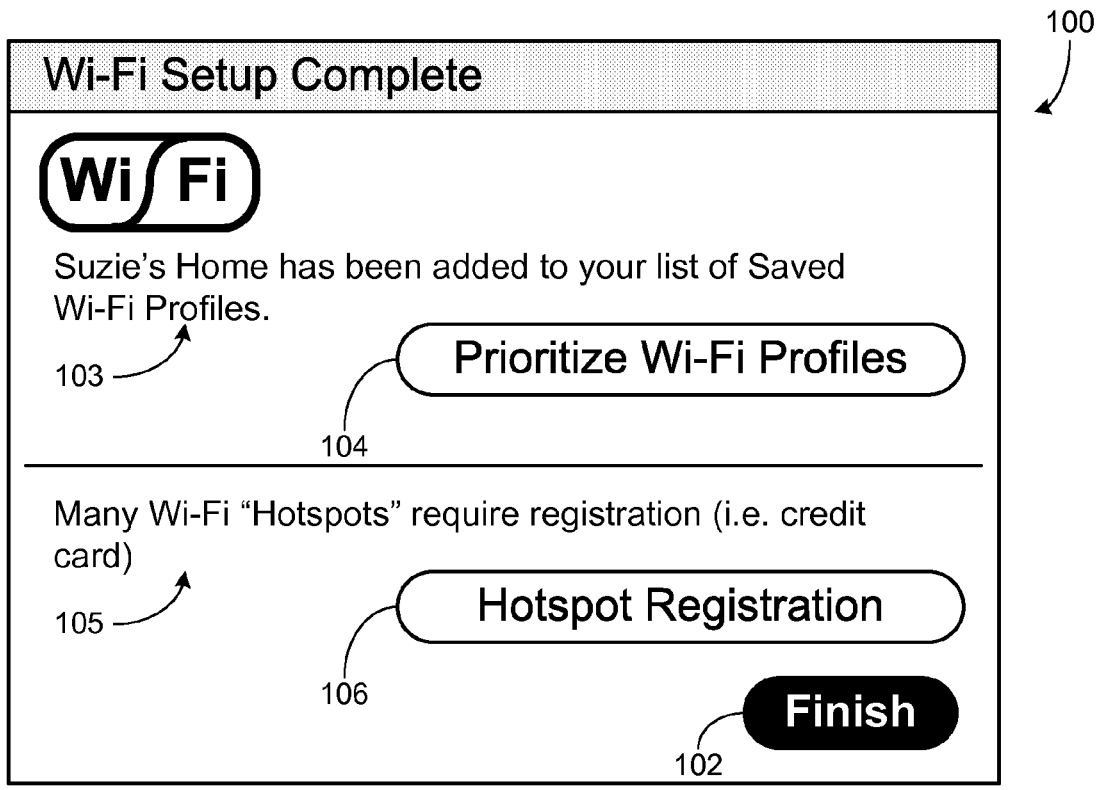

A virtual private network (VPN) is a private communications network used to communicate confidentially over a publicly accessible network. VPN message traffic can be carried over a public network infrastructure (e.g. the Internet) on top of standard protocols. VPNs are used, for example, to enable employees to connect securely to a corporate network. If a VPN client application is installed on device 1 and one or more VPN profiles have been defined, then the next screen following screen 80 or screen 88 is a VPN selection screen, as shown in FIGS. 9-1 and 9-2. Otherwise the next screen is a setup completion screen, as shown in FIGS. 10-1 and 10-2.

FIGS. 9-1 and 9-2 are illustrations of an exemplary screen 90 for VPN profile selection. Screen 90 is displayed only if one or more VPN profiles have been defined in device 1. In alternate implementations, screen 90 is always displayed and enables a user to define a VPN profile if none are defined yet.

If a single VPN profile is defined in device 1, screen 90 is displayed as shown in FIG. 9-1, with an indication of the VPN profile, e.g. the label "ABC-HQ", displayed in a text field 92.

If two or more VPN profiles are defined in device 1, screen 90 is displayed as shown in FIG. 9-2, with a drop-down menu 94 listing indications of the VPN profiles, for example, their labels.

A user specifies, via a "Yes"/"No" toggle button 96, whether to use one of the VPN profiles with the WLAN to which device 1 has just connected. If button 96 is set to "No", selecting a button 98 entitled "Next" causes a setup completion screen to be displayed. If button 96 is set to "Yes", selecting button 98 causes device 1 to attempt, using the VPN client application, to establish a VPN connection according to the VPN profile which label is displayed in text field 92 or selected in drop-down menu 94. If a connection profile for the WLAN is saved, device 1 associates the VPN profile with the connection profile of the WLAN so that subsequent connections of the device to the WLAN will automatically attempt to establish a VPN connection according to the associated VPN profile after the device obtains an IP address.

FIGS. 10-1 and 10-2 are illustrations of an exemplary setup completion screen 100. By selecting a button 102 entitled "Finish", screen 100 closes and icon 14 is displayed in home screen 2 (see FIG. 1) to indicate to the user that the device is connected to a WLAN. Screen 100 includes a message 103 informing the user that the connection profile of the WLAN to which device 1 has connected has been saved. Screen 100 also includes a button 104 entitled "Prioritize Wi-Fi Profiles" which, if selected, will close screen 100 and launch the profile management application.

Hotspot Registration

A hotspot is a venue that offers access to the Internet via a wireless local area network. Upon connecting to the WLAN, a WLAN client device is given an IP address. Access to a public network such as the Internet is provided by the WLAN via a gateway. The gateway may implement one or more IP filtering rules to limit IP addresses that can be accessed by the WLAN client device, thus providing access to what is known as a "walled garden". Subscription may be required and fees may apply in order to gain access to the public network.

Once device 1 has successfully connected to a WLAN, it sends via the WLAN a hypertext transfer protocol (HTTP) request to a particular IP address that is not normally redirected. This occurs automatically in the background, without any intervention by the user and without providing any feedback to the user. If the device receives a redirection response to the HTTP request, then device 1 has detected that the WLAN to which it is connected is offered by a hotspot. In this situation, device 1 may display an indication of this. For example, device 1 may display screen 100 as it appears in FIG. 10-2, rather than as it appears in FIG. 10-1. As shown in FIG. 10-2, screen 100 includes a description 105 about hotspots and a button 106 entitled "Hotspot Registration". Selecting button 106 launches a browser application of device 1 with an IP address that ought to trigger an IP filtering rule of the gateway. The browser will be redirected to a captive portal of the hotspot that may enable the user to register for access to the public network.

In an alternate implementation, upon detecting in the background that a WLAN to which device 1 has just connected is offered by a hotspot, where access to the Internet is provided by the wireless local area network via a gateway, a browser application of device 1 is automatically launched with an IP address that ought to trigger an IP filtering rule of the gateway.

Manually Adding Networks

Figure 11:
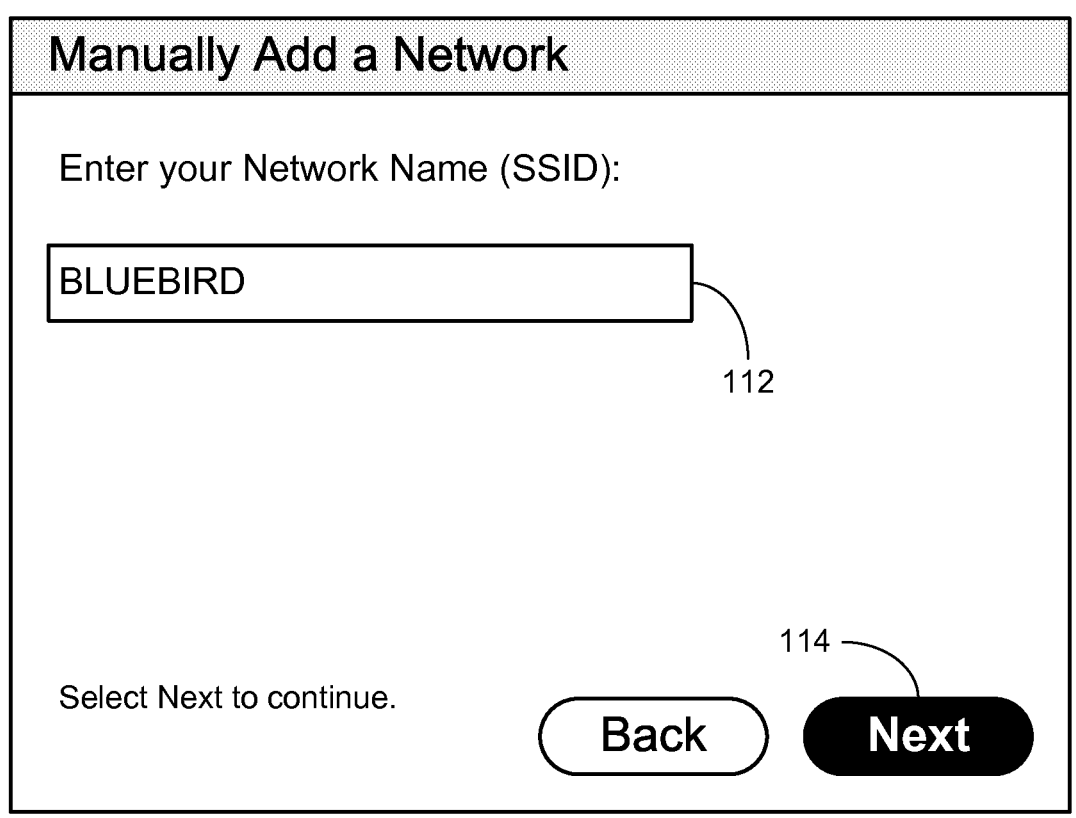
FIG. 11 is an illustration of an exemplary screen for manually adding a wireless local area network.

Returning briefly to FIG. 3, if the user selects button 34 entitled "Manually Add Network", the user will be prompted to specify the WLAN that the user wants device 1 to connect to. FIG. 11 is an illustration of an exemplary screen 110 that may appear after the user selects button 34. Using keyboard 4, the user may type the name of the network (SSID), which will appear in an editable text field 112. In the example shown in FIG. 11, the user has typed "BLUEBIRD". If the user then presses a button 114 entitled "Next", the user will be prompted to supply security credentials for the WLAN via screen 60, as described above with respect to FIGS. 6-1, 6-2, 6-3, 6-4, 6-5, 6-6, 6-7, 6-8, 6-9 and 6-10.

In an alternate implementation, when the user presses button 114, device 1 may scan for a WLAN having "BLUEBIRD" as its SSID. Device 1 may employ passive scanning techniques, active scanning techniques or any combination thereof. From the scan results, device 1 may identify whether the security configuration of the WLAN is none, WEP, PSK or IEEE 802.1X. If no security is required, device 1 may directly attempt to connect to the WLAN, and screen 70 will be displayed with the text "Connecting to BLUEBIRD . . . " instead of "Connecting to Rosencrantz . . . ". If security credentials are required, the user will be prompted to supply security credentials for the WLAN via screen 60, as described above with respect to FIGS. 6-1, 6-2, 6-3, 6-4, 6-5, 6-6, 6-7, 6-8, 6-9 and 6-10. If the scan results identify PSK as the configuration, screen 60 may appear as in FIG. 6-1. If the scan results identify WEP as the configuration, screen 60 may appear as in FIG. 6-2. If the scan results identify IEEE 802.1X but do not distinguish between the different types, screen 60 may appear with the drop-down options of security type restricted to the various EAP types.

WLAN Profile Management Application

Figures 1, 12:
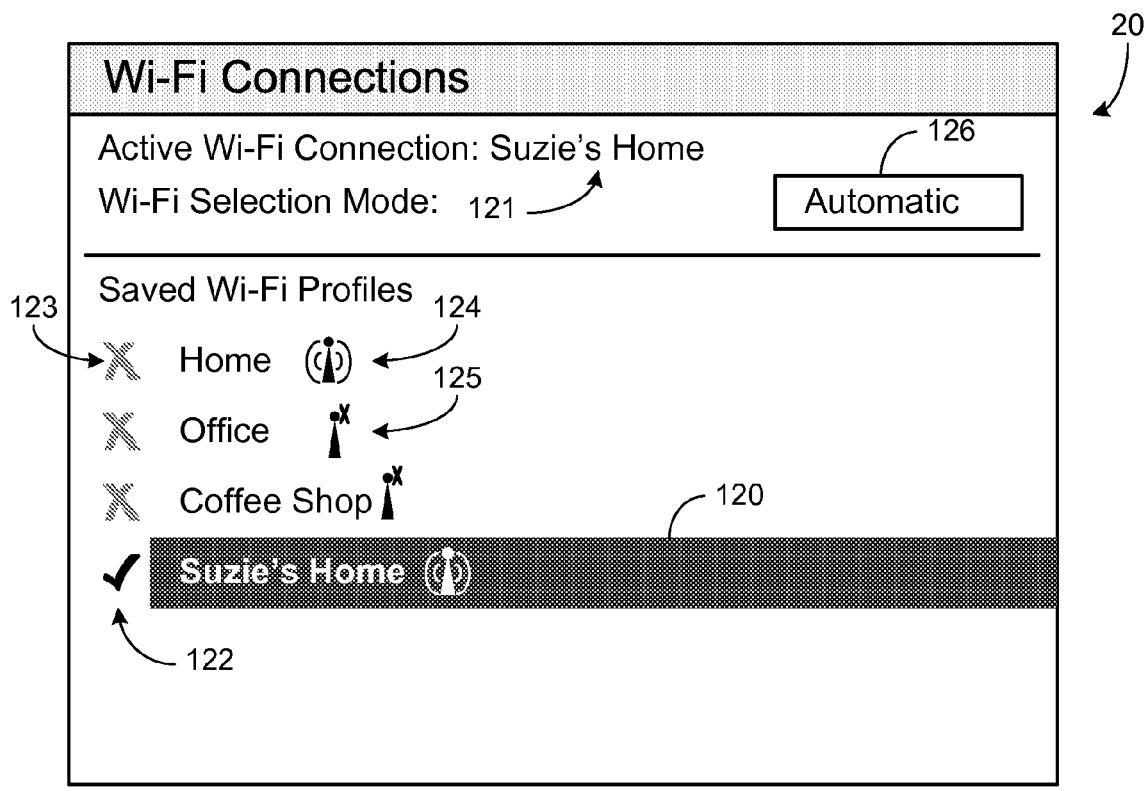
Figures 2, 12:
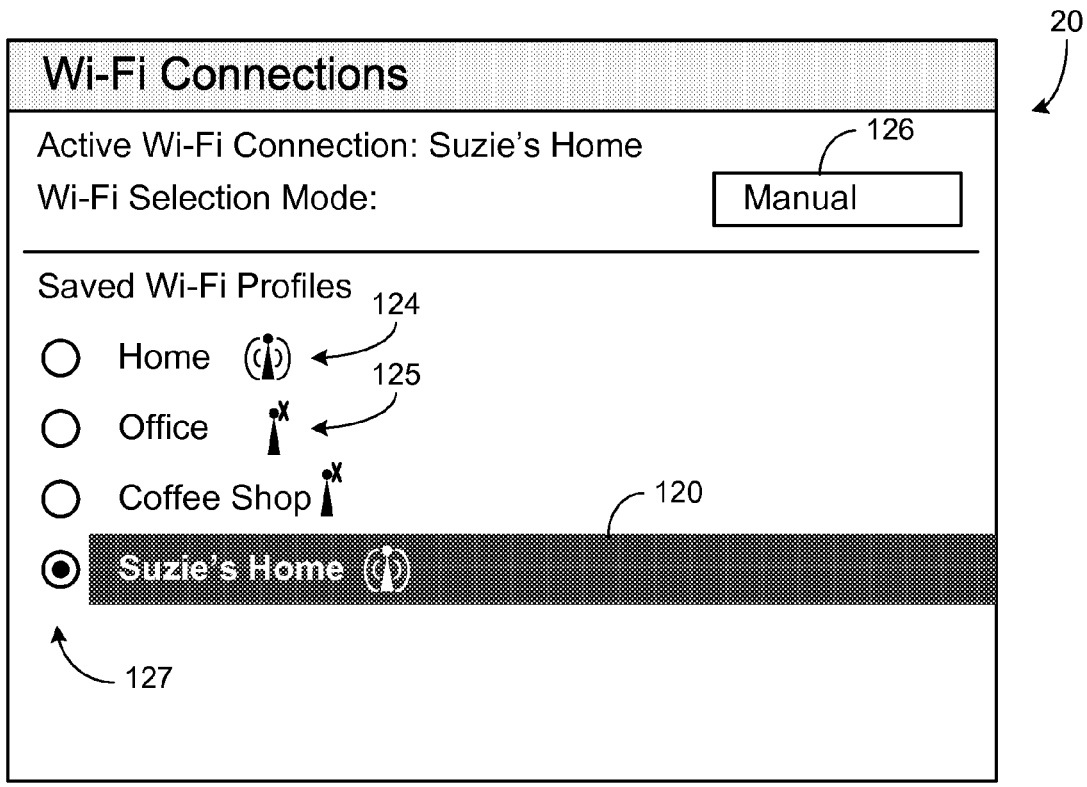

FIGS. 12-1 and 12-2 are illustrations of exemplary screen 20 of a wireless local area network profile management application. Connection profiles of WLANs are listed in screen 20 in decreasing order of priority. The relative priority of connection profiles may affect the order in which those connection profiles are compared to scanning results and therefore may also affect the order in which the device attempts to connect to WLANs matching those connection profiles. Connection profiles may be created with the lowest relative priority, by default.

The connection profile of the WLAN with which device 1 is currently connected may be automatically selected when opening screen 20, as indicated by a highlight bar 120. Further visual indications of the connection profile of the WLAN with which device 1 is currently connected include the connection profile name in a text field 121 near the description "Active Wi-Fi Connection" and a checkmark 122 next to the connection profile in the list. If device 1 is currently connected to a WLAN for which a connection profile is not saved, then the network name of that WLAN is displayed in text field 121. If device 1 is not connected to a WLAN, then text field 121 is blank or displays the text "None". A cross 123 identifies connection profiles of WLANs with which device 1 is not currently connected. If screen 20 is opened when device 1 is not connected to any WLAN, then the connection profile with the highest priority may be automatically selected. Alternatively, a newly created connection profile may be automatically selected in screen 20.

As is known in the art, scanning for WLANs may be performed in one of the following ways:

Manual Scans—A user initiates a scan for either a specific WLAN or for all available WLANs.

Background Profile Scans—Scans that occur from time to time in the background without user intervention, even if the device is already connected to a WLAN. Scan results are filtered to exclude WLANs having a received signal strength below a threshold. The enabled connection profile with the highest priority is then compared to the filtered scan results and if there is a match, the device attempts to connect to the matching WLAN. If there is no match, the enabled connection profile with the next highest priority is compared to the filtered scan results, and so on. Disabled connection profiles are not compared to the filtered scan results. The terms "enabled" and "disabled" are intended to distinguish between connection profiles of WLANs that are checked against results of background profile scans (and hence are termed "enabled") and connection profiles of WLANs that are not checked against the results (and hence are termed "disabled").

Neighbor Scans—Scans that occur from time to time in the background without user intervention, when the device is connected to a WLAN via an association with an access point. The scanning is restricted to neighboring access points within an IP subnetwork, based on the assumption that WLANs on different IP subnets have different SSIDs. If the quality of the wireless link between the device and the access point with which the device is associated drops below a threshold, the device may associate instead with a neighboring access point on the same IP subnetwork.

A visual indicator 124 of a broadcasting access point identifies enabled connection profiles and a visual indicator 125 of an access point with a cross identifies disabled connection profiles.

Returning briefly to FIG. 2, menu 22 associated with the WLAN profile management application applies to the selected connection profile. Selecting a menu item 25 entitled "Move Selection" enables the user to adjust the priority of the selected connection profile relative to the other connection profiles in the list by moving the selected connection profile within the list. For example, by adjusting a trackball or thumbwheel or by pressing the appropriate keys in a keyboard, the user may provide input to move the selected connection profile within the list. As the input is detected and processed, the list of connection profiles is updated to show the selected connection profile at a location in the list corresponding to the input. For example, if the input is a slight upwards motion of the trackball (where upwards is defined as the direction towards the top edge of the device), the selected connection profile will be displayed higher in the list than before.

The text of a menu item 26 toggles between "Disable" if the selected connection profile is enabled and "Enable" if the selected connection profile is disabled. Selecting menu item 26 will toggle the enabled/disabled status of the selected connection profile.

Selecting a menu item 27 entitled "Scan" will cause device 1 to scan for and attempt to connect to the WLAN matching the selected connection profile. A user may also initiate this by clicking the selected connection profile or providing other appropriate input (for example, pressing an "Enter" button on the keyboard) while a connection profile is selected and menu 22 is closed.

Returning to FIGS. 12-1 and 12-2, a Wi-Fi selection mode "Automatic"/"Manual" toggle button 126 allows the user to enable or disable background profile scanning. If button 126 is set to "Manual", as shown in FIG. 12-2, then radio buttons 127 appear next to the connection profiles and the user may select which of the connection profiles to scan for and attempt to connect to.

Other Ways to Launch Wireless Connections Management Application

Returning briefly to FIG. 1, icon 14 may appear in the home screen when device 1 is connected to a WLAN. If device 1 also has a WWAN communication interface, an icon 16 may appear in the home screen when device 1 is connected to a WWAN. Likewise, if device 1 also has a WPAN communication interface, an icon (not shown) may appear in the home screen when device 1 is connected to a WPAN. Selecting any of icons 14, 16 and the WPAN icon may launch a wireless connections management application. List 8 also includes an icon 18 which if selected will launch the wireless connections management application.

Figure 13:
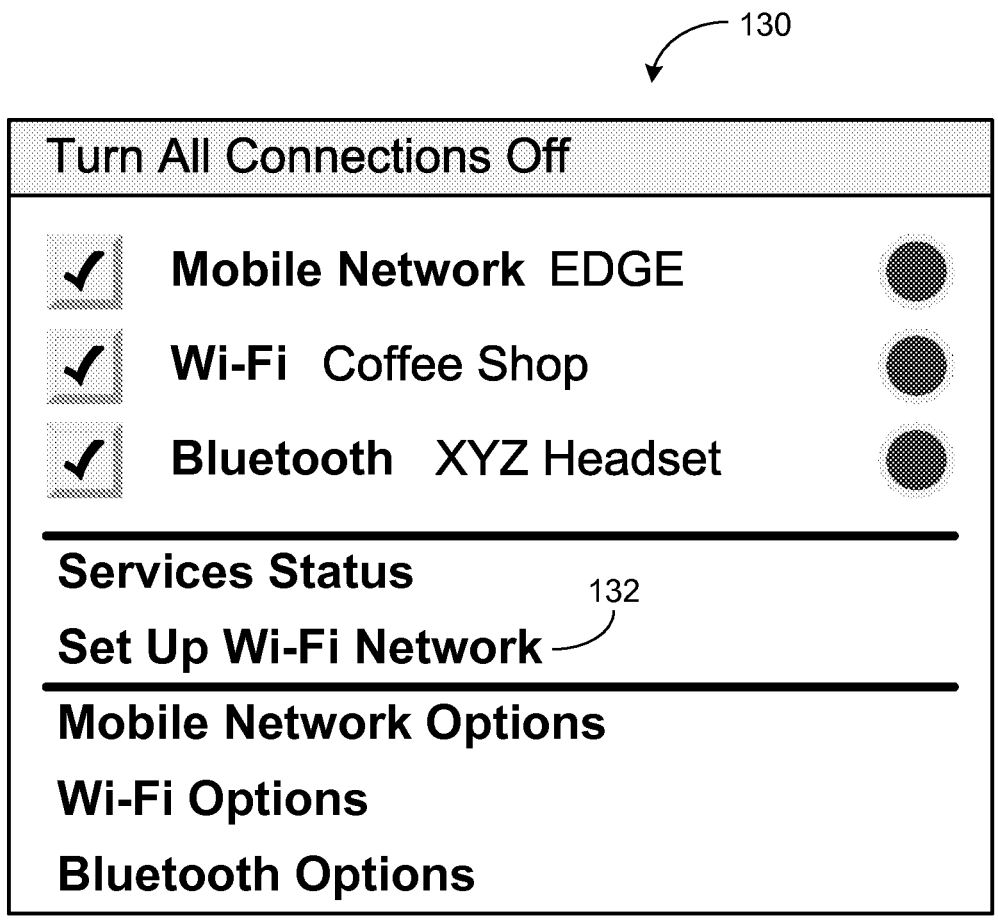
FIG. 13 is an illustration of an exemplary screen for a wireless connections management application.

FIG. 13 is an illustration of an exemplary screen 130 shown when the wireless connections management application is launched. Selecting a menu item 132 entitled "Set Up Wi-Fi Network" will launch the WLAN connection setup application described above, beginning at screen 30 (described above with respect to FIG. 3).

Details of Handheld Device

Figure 14:
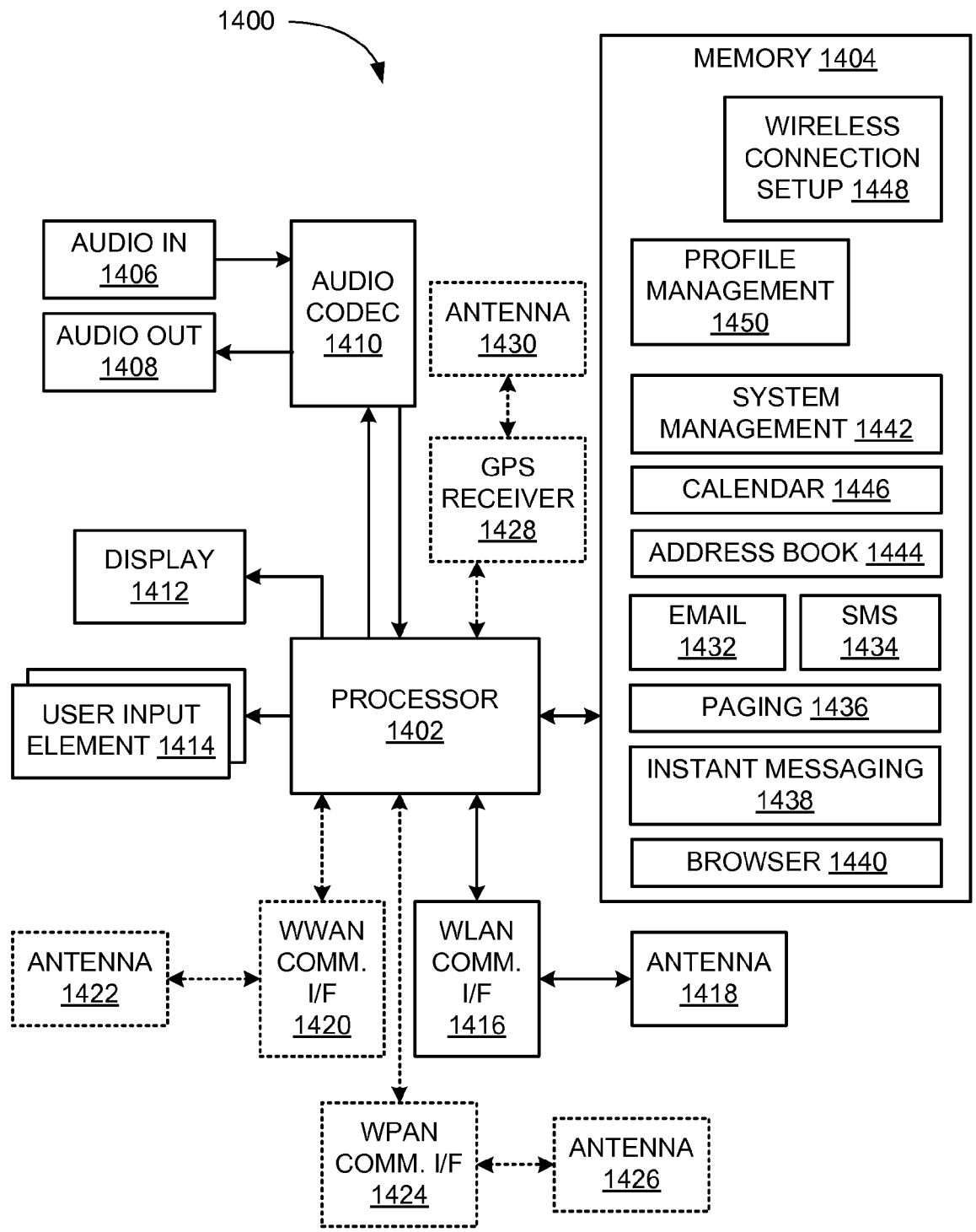
FIG. 14 is a block diagram of an exemplary handheld device.

FIG. 14 is a block diagram of an exemplary handheld device 1400. For clarity, some components and features of a handheld device 1400 are not shown in FIG. 14 and are not described explicitly below. Handheld device 1400 includes a processor 1402 and a memory 1404 coupled to processor 1402. Handheld device 1400 includes an audio input element 1406, for example a microphone, an audio output element 1408, for example, a speaker, and an audio coder-decoder (codec) 1410, however, the technology described herein is also applicable to devices without these audio components.

Handheld device 1400 includes a display 1412 coupled to processor 1402. Handheld device 1400 also includes one or more user input elements 1414 coupled to processor 1402, for example, a keyboard and a trackball. Handheld device 1400 may include additional user input and/or output elements that are not shown in FIG. 14, for example a thumbwheel. A keyboard may be embedded in full or in part within display 1412, i.e. display 1412 may be a touch screen.

Handheld device 1400 includes a WLAN communication interface 1416 coupled to processor 1402 and to an antenna 1418. Communication interface 1416 is compatible with one or more WLAN standards, for example, IEEE 802.11 or ETSI HIPERLAN, and includes a WLAN controller and a radio.

Handheld device 1400 optionally also includes a WWAN communication interface 1420 coupled to processor 1402 and to an antenna 1422. Communication interface 1420 is compatible with one or more WWAN standards, for example, cellular communication standards, and includes a WWAN controller and a radio.

Handheld device 1400 optionally also includes a WPAN communication interface 1424 coupled to processor 1402 and to an antenna 1426. Communication interface 1424 is compatible with one or more WPAN standards, for example, Bluetooth®, ZigBee™, radio frequency identification (RFID), ultra wideband (UWB) and the like.

Handheld device 1400 may optionally also include a Global Positioning System (GPS) receiver 1428 coupled to processor 1402 and to an antenna 1430.

Each communication interface includes a controller and a radio, and the radio is coupled to an antenna. Controllers may share the same hardware, but logically they are independent. Analog components of the radios may be shared, but digital components of the radios are most likely to be independent. Depending on the frequencies, antennas could be shared among the communication interfaces. By way of the communication interfaces and antennas, handheld device 1400 may be able to establish telephone and/or data communication sessions with other systems (not shown).

Data communication sessions may include data in the form of plain text, data files, voice files, image files, movie files, streaming audio, streaming video, animation, or any other suitable data form. A non-exhaustive list of examples for data communication sessions includes sending and receiving electronic mail (e-mail), sending and receiving instant messages, sending and receiving paging messages, sending and receiving short message service (SMS) messages, and any other suitable data communication sessions. For data communications supported by handheld device 1400, memory 1404 may store respective application modules to be executed by processor 1402, for example, an e-mail application module 1432, an SMS application module 1434, a paging application module 1436, an instant messaging application module 1438, and a web browser application module 1440.

Memory 1404 stores a system management application module 1442 and may optionally store other application modules, for example, an address book or contacts application module 1444 and a calendar application module 1446. These application modules are just examples, and the technology described herein is also applicable to handheld devices with a different set of application modules.

Memory 1404 may store executable code 1448 which, when executed by processor 1402, implements a wireless connection setup application, and executable code 1450 which, when executed by processor 1402, implements a wireless connection profile management application.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for saving a connection profile of a wireless local area network 'WLAN', the method comprising:

obtaining information regarding a particular WLAN for which a connection profile is not stored in a WLAN client device;

attempting to connect to the particular WLAN using the information;

displaying via a display of the WLAN client device an indication that the attempt was unsuccessful due to the WLAN client device being out of range of the particular WLAN; and responsive to the unsuccessful attempt to connect to the particular WLAN, displaying a prompt to save the information in a connection profile in the WLAN client device, wherein the information includes a network name of the particular WLAN.

2. The method of claim 1, further comprising:

receiving the network name via a user input element of the WLAN client device.

3. The method of claim 1, further comprising:

gleaning the network name from a signal received at the WLAN client device over the particular WLAN.

4. The method of claim 1, wherein the connection profile is a persistent connection profile requiring user intervention to be deleted from the WLAN client device, the method further comprising:

receiving, via a user input element of the WLAN client device, an indication to save the information in the persistent connection profile.

5. The method of claim 1, wherein the connection profile is a transient connection profile that has a limited lifetime, the method further comprising:

receiving, via a user input element of the WLAN client device, an indication not to save the information in a persistent connection profile requiring user intervention to be deleted from the WLAN client device.

6. A wireless local area network 'WLAN' client device comprising:
a processor;
an antenna;
a WLAN communication interface coupled to the processor and to the antenna;
a display coupled to the processor; and
a memory coupled to the processor, the memory able to save connection profiles of wireless local area networks, the memory storing code which, when executed by the processor, obtains information regarding a particular WLAN for which a connection profile is not stored in the memory, and if an attempt via the WLAN communication interface and the antenna to connect to the particular WLAN using the information is unsuccessful due to the WLAN client device being out of range of the particular WLAN, displays via the display an indication that the attempt was unsuccessful due to the WLAN client device being out of range of the particular WLAN, and responsive to the unsuccessful attempt, displays a prompt to save the information in a connection profile in the memory,
wherein the information includes a network name of the particular WLAN.

7. The WLAN client device of claim 6, further comprising:
a user input element coupled to the processor,
wherein the code, when executed by the processor, receives the network name via the user input element.

8. The WLAN client device of claim 6, wherein the code, when executed by the processor, gleans the network name from a signal received over the particular WLAN via the antenna and the WLAN communication interface.

9. The WLAN client device of claim 6, further comprising:
a user input element coupled to the processor,
wherein the connection profile is a persistent connection profile requiring user intervention to be deleted from the WLAN client device and the code, when executed by the processor, receives via the user input element an indication to save the information in the persistent connection profile.

10. The WLAN client device of claim 6, further comprising:
a user input element coupled to the processor,
wherein the connection profile is a transient connection profile that has a limited lifetime and the code, when executed by the processor, receives via the user input element an indication not to save the information in a connection profile.

* * * * *